United States Patent [19]

Suwa

[11] 3,972,591
[45] Aug. 3, 1976

[54] GREATLY VARIABLE MAGNIFICATION ZOOM LENS SYSTEM OF LARGE APERTURE RATIO

[75] Inventor: Michiharu Suwa, Fuchu, Japan

[73] Assignee: Canon Kabushiki Kaisha, Tokyo, Japan

[22] Filed: Sept. 16, 1974

[21] Appl. No.: 506,128

Related U.S. Application Data

[63] Continuation of Ser. No. 326,749, Jan. 26, 1973, abandoned.

[30] Foreign Application Priority Data

Feb. 1, 1972    Japan............................ 47-11707

[52] U.S. Cl. ............................................. 350/184
[51] Int. Cl.² ........................................ G02B 15/16
[58] Field of Search ............................ 350/184, 186

[56] References Cited
UNITED STATES PATENTS

| | | | |
|---|---|---|---|
| 2,741,155 | 4/1956 | Hopkins | 350/184 |
| 3,507,555 | 4/1970 | Isshiki | 350/184 |
| 3,584,935 | 6/1971 | Kojima | 350/184 |

*Primary Examiner*—Paul A. Sacher
*Attorney, Agent, or Firm*—Toren, McGeady and Stanger

[57] ABSTRACT

Attention has been directed to the fact that in zoom objective lens systems, the compensator for compensating the focal point shift caused by the zoom movement of the variator has generally two solution curves. A novel zooming mechanism such that the compensator is transferred from one to the other solution curve in the middle position of the zooming is employed in a zoom lens system to which this invention relates. As a result, this permits the variator and compensator to partake equally the function on magnification variation to enable minimizing the image shift sensitivity of each movable lens group and making the diameter of the front lens element small, and moreover compensating the variation of aberrations to very good degree.

5 Claims, 21 Drawing Figures

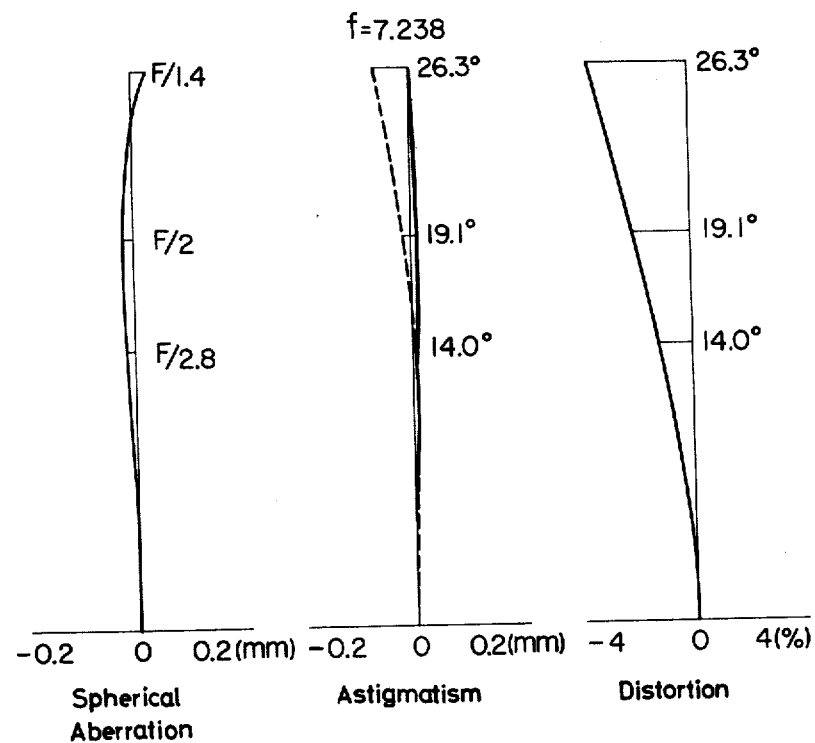
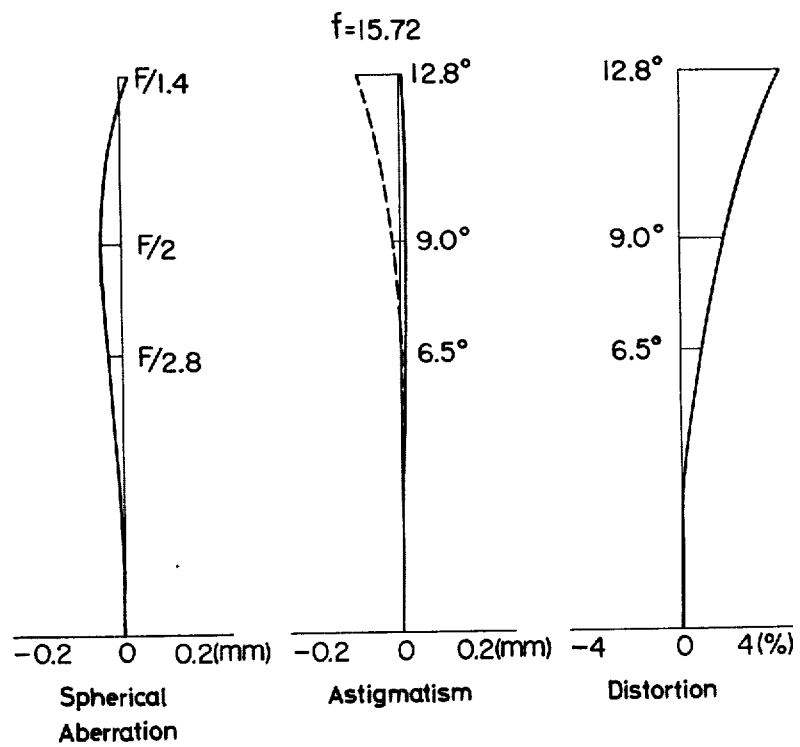

f=68.79 f=7.239

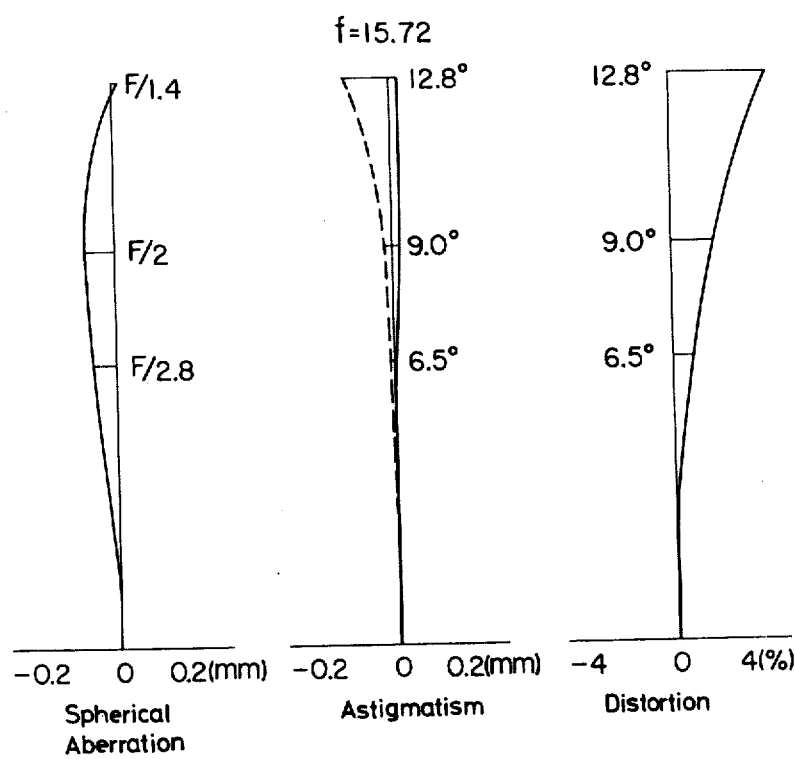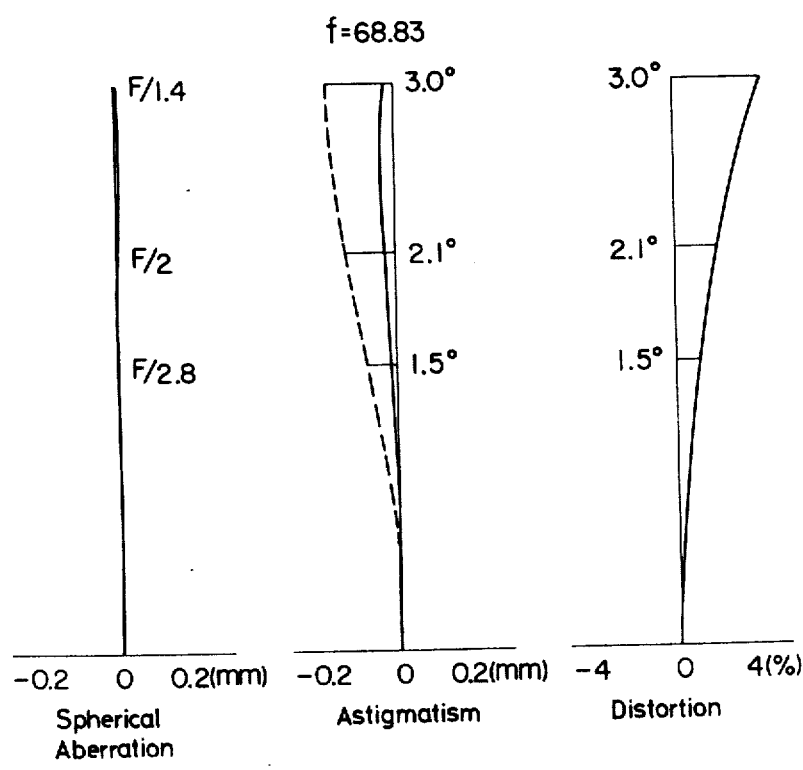

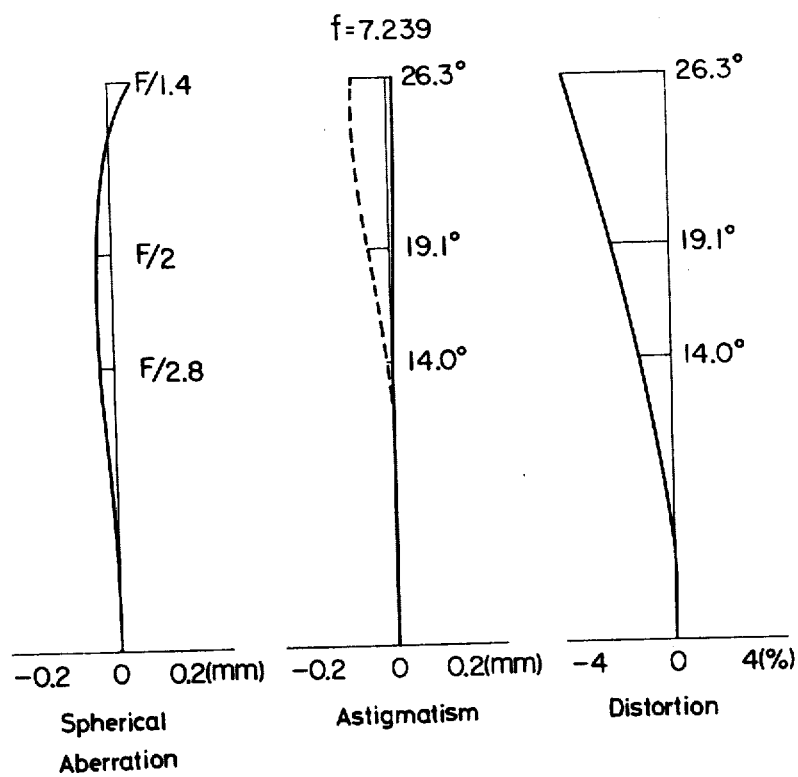
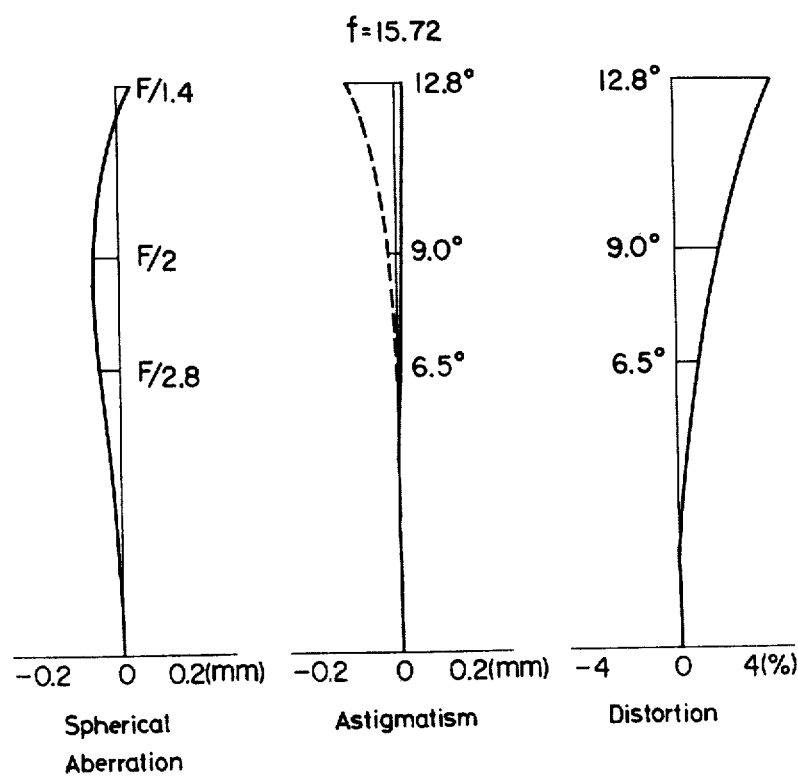

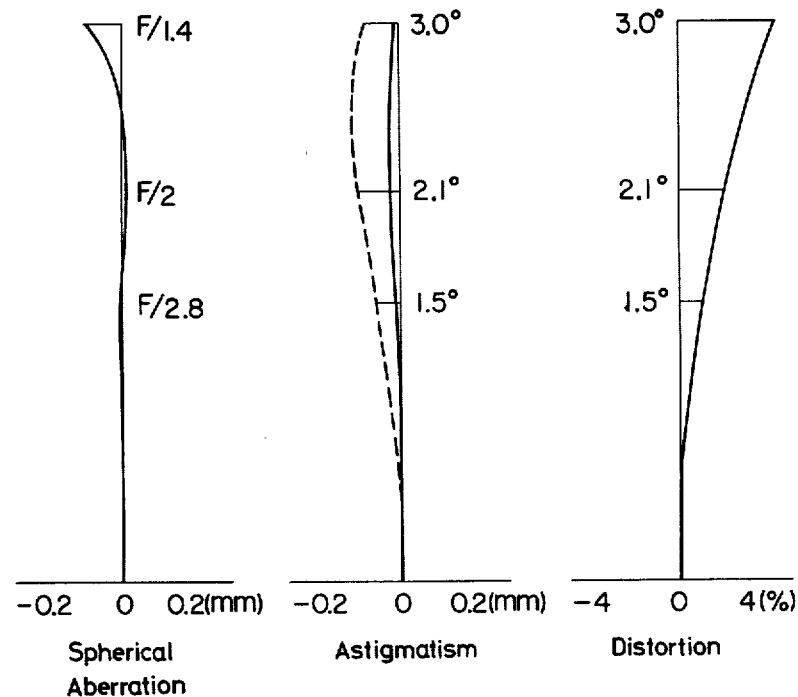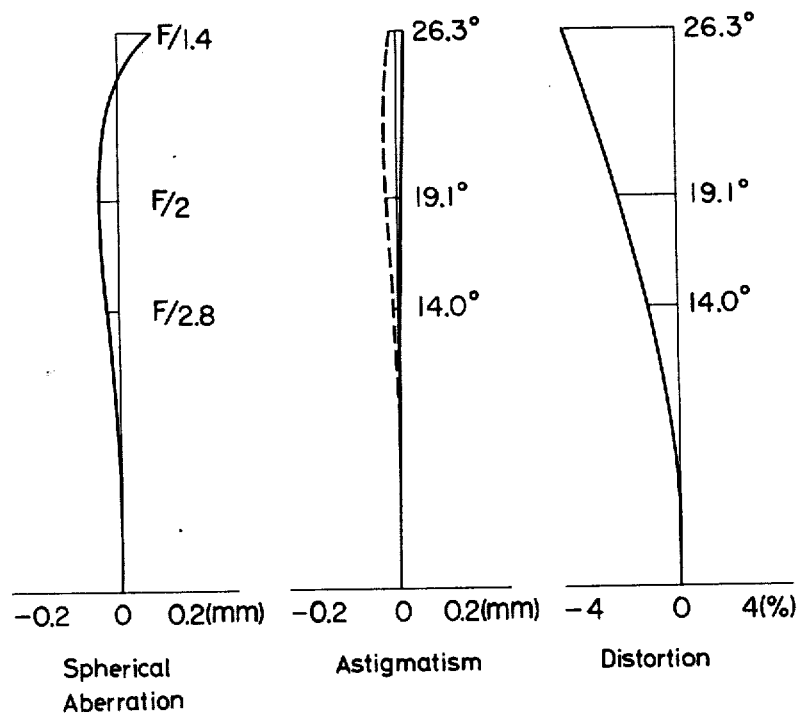

f=15.72 f=68.83

GREATLY VARIABLE MAGNIFICATION ZOOM LENS SYSTEM OF LARGE APERTURE RATIO

This is a continuation of application Ser. No. 326,749 filed on Jan. 26, 1973, now abandoned.

This invention relates to a zoom lens having a greatly increased range of magnification and large aperture ratio including wide angle which has its use for purposes of projection and the like.

In zoom objective lenses of the general type, the equivalent focal length or magnification power can be continuously varied by the axial movement of a certain lens group of the optical system to certain other stationary lens groups, and at the same time, certain another lens group is moved in differential relation to the former to effect the focal point shift compensation. In such mechanically-compensated zoom lens system, it is usual that the two movable lens groups play their respective roles distinctly different from each other. In many cases, the axial movement of the latter lens group for compensating the image shift causes the normal veriation in magnifying power of the system in certain part of the entire zooming region, but it causes the adverse variation in magnifying power in the other part, as a result, contributing almost no magnification variation to the system in the entire zooming region as a whole. For example, in a zoom objective lens of the proto-type as shown in FIG. 1, in which when lens group II is linearly moved along the optical axis while maintaining the afocal optical assembly together with lens group III for compensating the focal point shift, the axial movement of lens group III causes no variation in magnification in the entire zooming region. In the type shown in FIG. 2, the movement of lens group III causes the variation in magnification (increase of magnification) until the magnifying power of lens group II is up to minus unit, but otherwise it causes the adverse variation in magnification (decrease of magnification). Therefore, linearly movable lens group II (the first movable lens group) is usually called "variator", while lens group III (the second movable lens group) "compensator".

Therefore, when some modifications of the zoom lens of the type described are intended to provide a desired but greatly increased range of magnification, it will be unavoidable to increase extremely the necessary amount of movement of the variator, so that this construction will involve the drawback that a long total length of the entire lens system along the optical axis is required, resulting in a large diameter of the front lens element of the lens system. On the other hand, when the minimization of the amount of movement of the variator is intended in order to decrease the diameter of the front lens element of the lens system, the refractive power of each movable lens group should be increased, so that the compensation for the variation of residual aberrations caused by the zooming becomes difficult to be achieved in the greatly variable magnification zoom lens of large aperture ratio. In other words, when the type shown in FIG. 2, in which the refractive power of the first movable lens group is negative and the refractive power of the second movable lens group is positive, is modified so as to provide a greatly variable magnification zoom lens of large aperture ratio including wide angle, the variation of residual distortion caused chiefly by the zoom movement of the first movable lens group will be intensified, and the under-correction of residual spherical aberation will result from the second movable lens group in the middle position of the zooming. Further, as the refractive power of each movable lens group increases, the "image shift sensitivity" (defined as $\delta_q/\delta_p$ wherein $\delta_q$ is the infinitesimal amount of each movable lens group moved, and $\delta_p$ is the focal point shift caused thereby, which indicates the degree of influence of independent infinitesimal movement of each movable lens group on the focal point shift. For convenience, it is herein called "image shift sensitivity") increases. In manufacturing zoom lenses of the type described above, very severe tolerances of values for the lens parameter should be specified, restricting largely the production run particularly in the case of zoom lenses of large aperture ratio because of the small depth of focus.

For overcoming the above-mentioned defects in the aspect that when the first movable lens group is moved along the optical axis to effect a change in magnification, the axial movement of the second movable lens group which effects the focal point shift compensation has generally two solution curves as shown in FIG. 2, this invention employs a novel zooming mechanism such that the second lens group is allowed to transfer from one to the other solution curve in the middle position of the zooming. As a result, this permits the first and second movable lens groups to partake equally in the function on magnification variation to enable decreasing the image shift sensitivity and making the diameter of the front lens element small while nevertheless the variation of aberrations being compensated to very good degree.

The constructional feature resides in that:

A zoom lens system comprising lens group I of positive power, lens group II of negative power, lens group III of positive power and lens group IV of positive or negative power arranged successively on the common optical axis, whereby lens groups II and III are movable relative to lens group I to effect continuous magnification variation, said lens system satisfying the conditions that the focal lengths and magnification powers of the lens groups, designated as fi, mi ($i = 1 - 4$) respectively, are defined by $$0.18 f_1 < |f_2| < 0.42 f_1$$
$$0.35 f_1 < f_3 < 0.90 f_1$$

1.

and when the equivalent focal length of the entire system varies from the minimum to the maximum with continuous variation in magnification, $|m_2|$ and $|m_1|$ not only increase in simple fashion, but coincide with each other at unit magnification (or $m_2 = m_1 = -1$) within the zooming region, whereby the relationship between the distance through which lens group II is displaced from the minimum equivalent focal length position to the coincidence position and the whole distance through which lens group II can be displaced from the minimum to maximum equivalent focal length position, designated as $V_{m_2} = 1$ and $V_{max}$ respectively, is established that in the ratio of $V_{m_2} = 1 / V_{max}$, designated as $\alpha$ $$0.50 < \alpha < 0.95$$

2.

The present invention will be now explained with reference to the attached drawings.

Figure 10C:
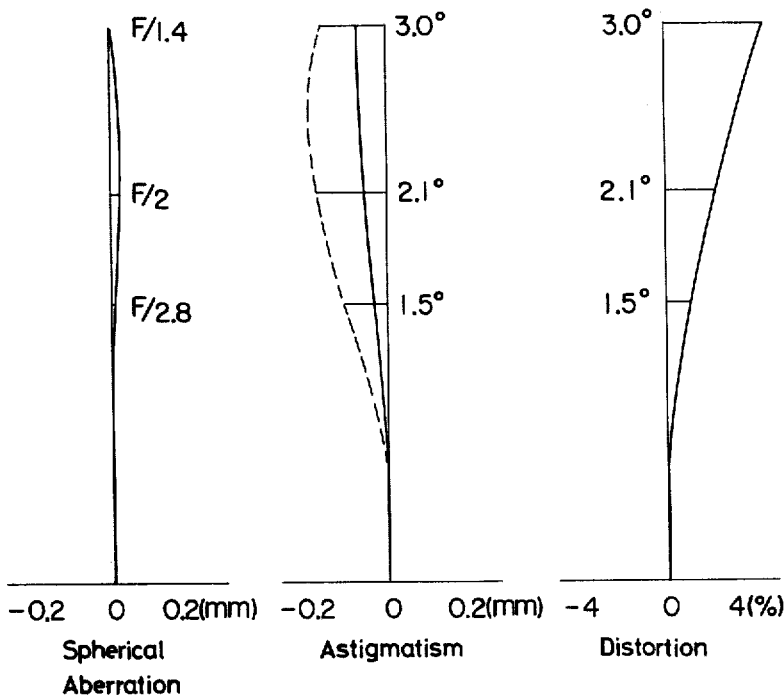
Figure 11A:
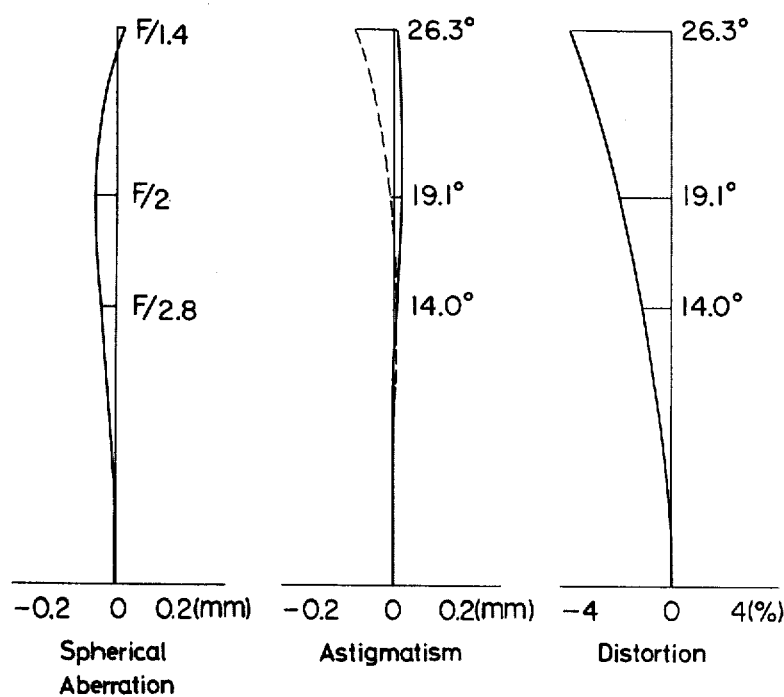
Figure 13B:
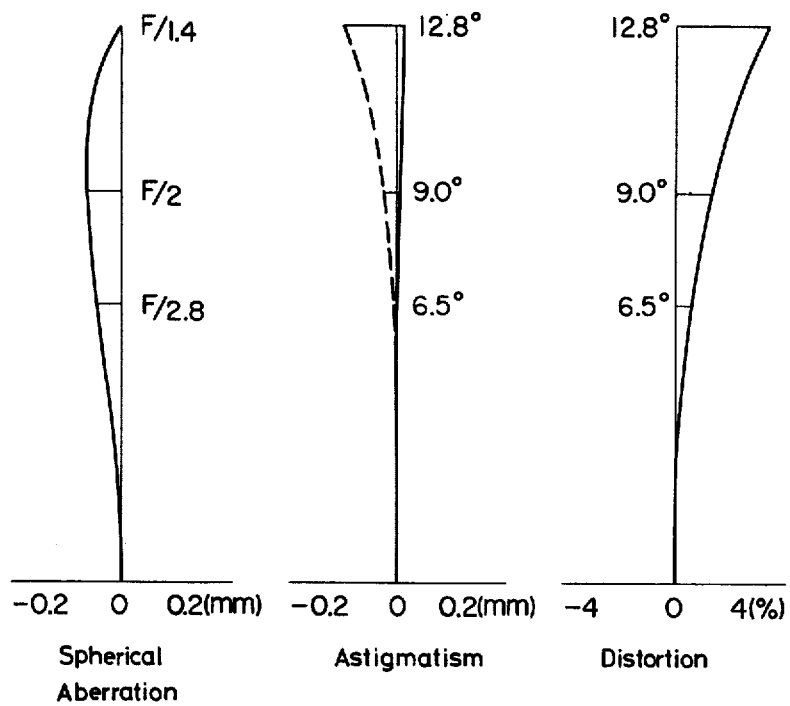
Figure 13C:
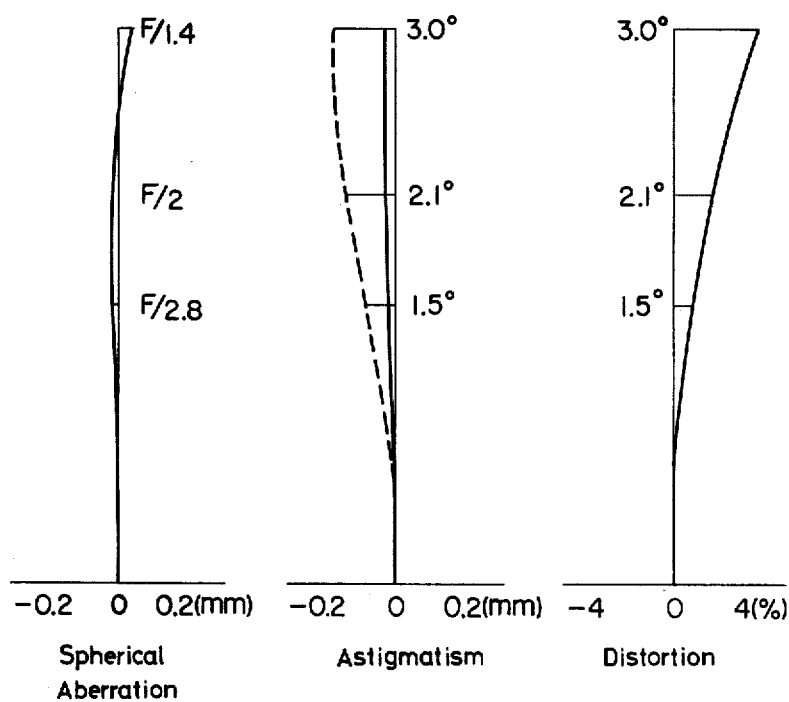

FIGS. 10abc – FIGS. 13abc show aberration graphs of above-mentioned Examples at the shortest, intermediate and longest focal length positions respectively.

The lens groups I and IV remain axially stationary during the zooming, and the lens groups II and III are movable for contributing the magnification variation to the system. Lens group I is the so-called focusing member for use in focusing in adjustment on an object point at an arbitrary distance to form an image thereof on a spatial fixed point P. Lens groups II and III are the so-called zooming members, by means of which the magnifying power of the entire optical system is varied. The image point P focused by the focusing member is brought into focus by means of the zooming members on another spatial fixed point P' during the zooming. The lens group IV is the so-called relay member by means of which the image point P' focused by the zooming members is brought into focus on the film.

As the movable lens groups are moved, the image points focused by the lens groups are magnified, being regarded as the new object points for their respective subsequent movable lens groups, namely the image point focused by lens group I being regarded as the object point for lens group II, and the image point focused by the assembly of lens groups I and II being regarded as the object point for lens group III, with magnifications $m_2$ and $m_3$ respectively. In this case, unless the individual magnifying powers of the lens groups simultaneously increase or decrease, they will be cancelled by each other, thus an effective magnification variation will not result.

Figure 1:
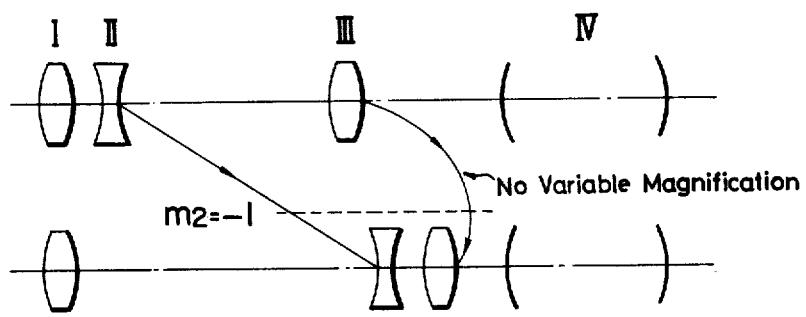
FIGS. 1 – 5 are diagrams illustrating fundamental constructions or principles of zoom lenses.
Figure 2:
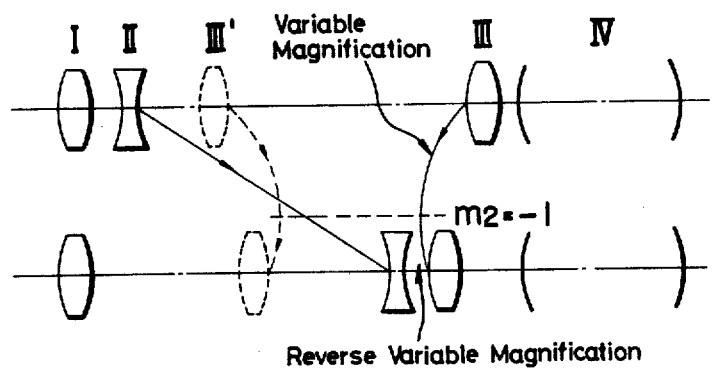
Figure 3:
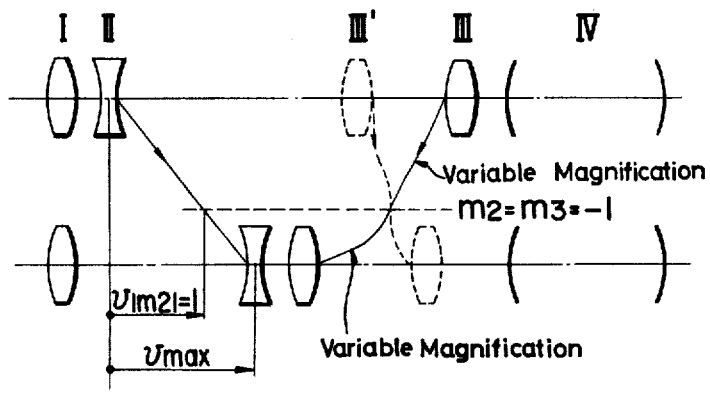

If the equivalent focal length of the lens group II in FIG. 1 is algebraically smaller than a certain value (that is, in the case of $f_3 > 0$, the refractive power is larger than a certain value, while in the case of $f_3 < 0$, any value will do), the trajectory along with the lens group reciprocates to effect the focal point shift compensation will be a curve which is convex toward lens group II as shown in FIG. 2. In particular case lens group II is linearly moved while maintaining minus unit magnification during the zooming, the trajectory along which lens group III reciprocates to effect the image shift compensation is a curve of second degree, and there are two solution curves for the trajectory, whereby the rear to front movement of lens group III effects a normal variation in magnification (increase of magnification), but the front to rear movement effects an adverse variation in magnification (decrease of magnification). (A similar situation occurs in the case of the other solution curve III' shown by the dotted line in FIG. 2). However, by distributing properly the refractive powers of the lens groups, these two curves III, III' can be made to approach each other even to come in touch with each other as shown in FIG. 3. Upon touch, the two curves are connected to each other at the contact point so that the one-directional non-linear movement of lens group III can be effected without causing the adverse magnification variation throughout the entire zooming region while maintaining precise image shift compensation.

Figure 5:
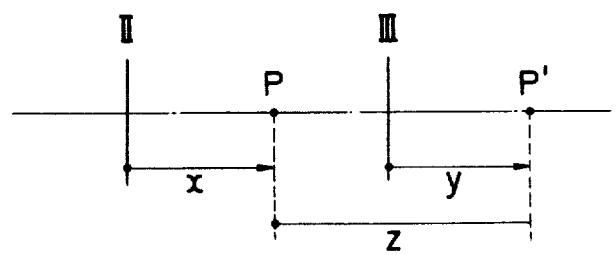
Figure 6:
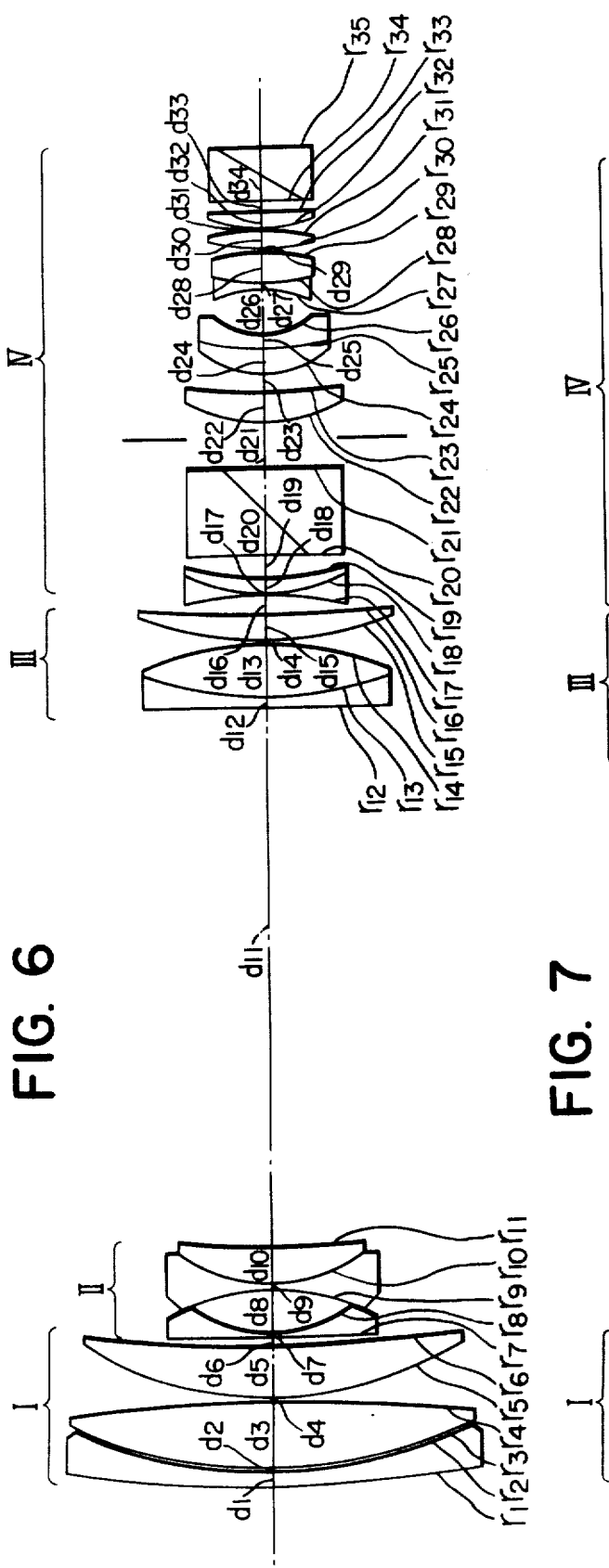
FIGS. 6 – 9 are sectional views of lens diagrams embodying the examples of this invention.
Figure 7:
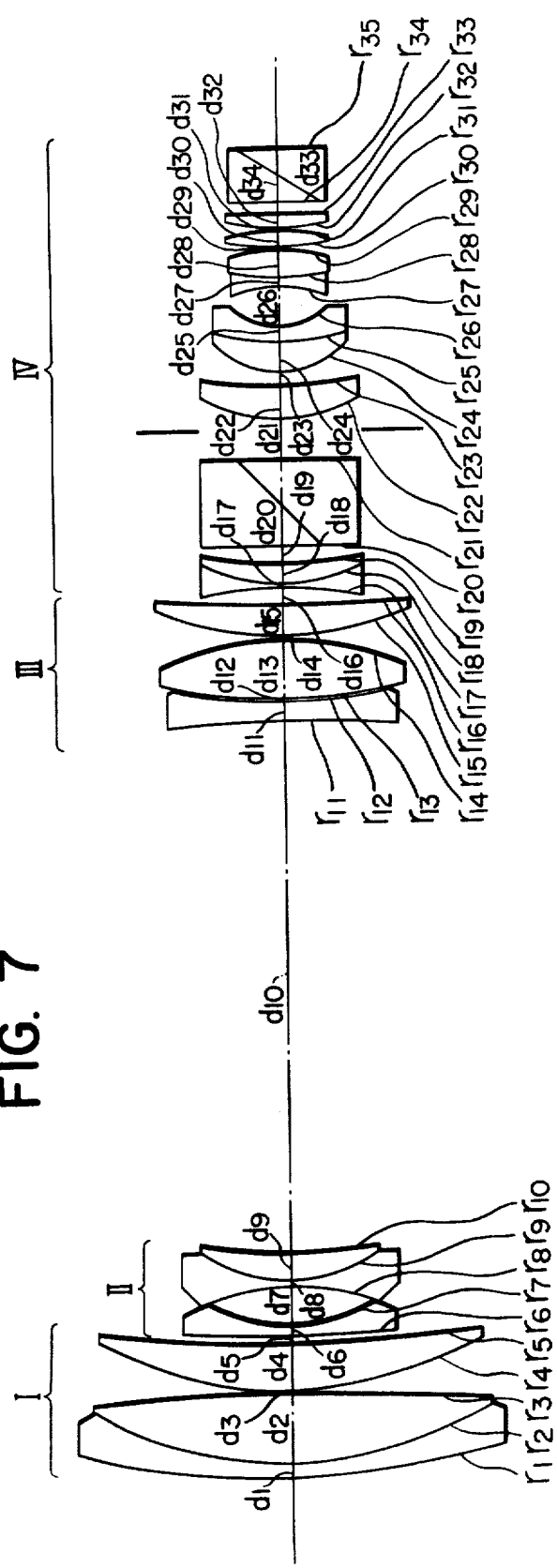
Figure 8:
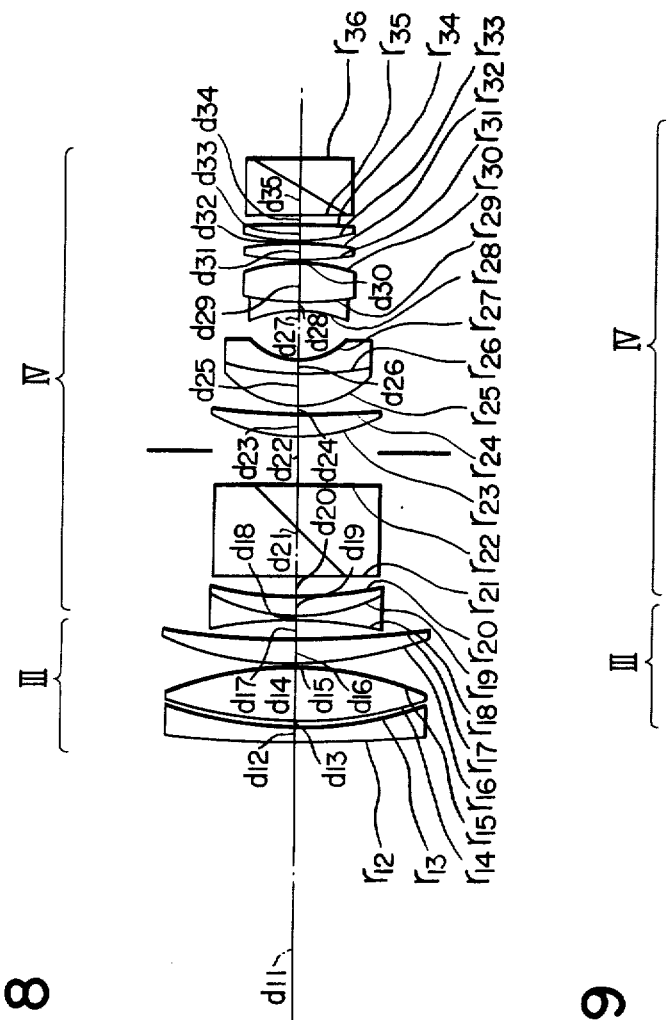
Figure 9:
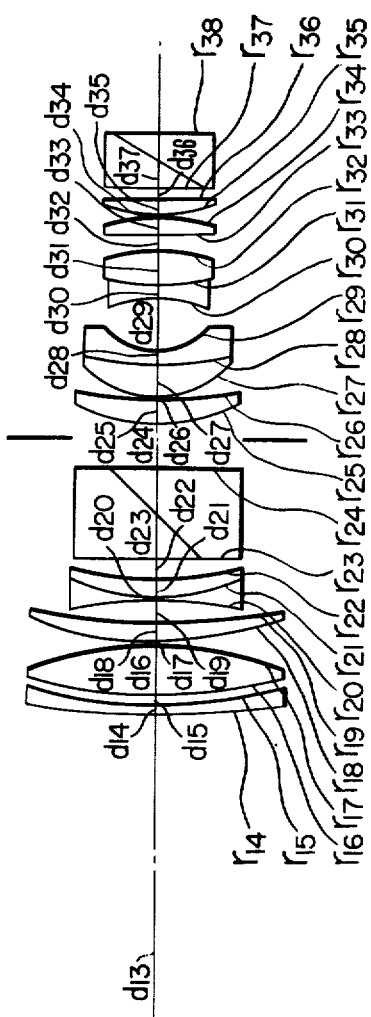

A more detailed explanation will be now made with reference to FIG. 5. An object point and image point of the zooming members being designated as P and P' respectively, i.e. the object point P to lens group II, the image point P' focused by lens group III, the distance x from lens group II to P, the distance y from lens group III to P', the distance z from P to P', the focal length $f_2$ of lens group II and the focal length $f_3$ of lens group III, the focusing relationship from P to P' is expressed by $$y^2 - \left\{ \frac{x^2}{x+f_2} + z \right\} y + f_3 \left\{ \frac{x^2}{x+f_2} + z \right\} = 0 \quad 3$$

y has equal roots with a certain value of x, so that the two curves touch each other at the value of y. The discriminant for the condition is given by $$x^2/x + f_2 + z = 4f_3 \quad 4.$$

so that the equal roots of y is determined from (3) to be $$y = 2f_3 \quad 5.$$

While (4) becomes $$x^2 + (z - 4f_3)x + f_2(z - 4f_3) = 0 \quad 6.$$

The two curves cross with each other at the two values of x satisfying equation (6), and when the two values are equal, the two curves touch each other. The discriminant for the condition $$z - 4f_3 = 4f_2 \quad 7.$$

so that the equal roots of x is determined from (6) to be $$x = -2f_2 \quad 8.$$

Equations (5) and (8) show that each of the positions of lens groups II and III satisfying the condition is associated with minus unit magnification.

Figure 4:
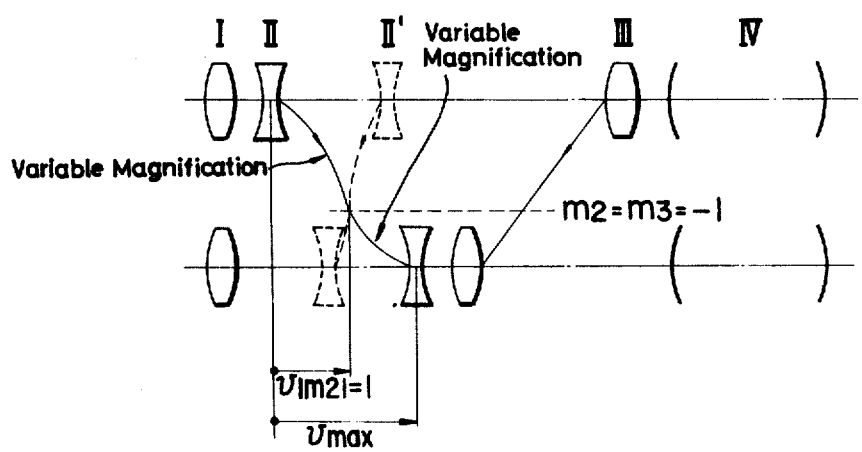

As a matter of convenience with reference to FIGS. 2 and 3, mention has so far been made of the fact that the linear movement of lens group II is associated with the two movement curves of lens group III for compensating the image shift. But as shown in FIG. 4, the linear movement of lens group III is also associated with two movement curves of lens group II for compensating the image shift, and it can be easily proved likewise from (3) that the movement of lens group II when transferred at the contact point of minus unit magnification effects the image shift compensation without causing the adverse variation in magnification throughout the entire zooming region. Thus it has been proved that when one of the movable lens groups is linearly moved, the one-directional non-linear movement should be given to the other movable lens group, and that in order to effect perfect image shift compensation, the magnifying powers of the both movable lens groups should coincide with each other at minus unit magnification.

As is well known, in the general optical system, when the magnifying power of the lens assembly is minus unit, the distance between the object and image points becomes minimum with respect to the variation in displacement or magnification power of the lens assembly. In other words, in the neighborhood of minus unit magnification, the focusing reliability is easy to be maintained against the considerable variation of the displacement or magnification power. Therefore, it is desirable that the magnification powers of the both movable lens groups coincide with each other at minus unit magnification in the zooming region as in this invention. This is one of the advantages of this invention.

The zooming ratio of each movable lens group can be made as small as about $\sqrt{R}$ (wherein R is the zooming ratio of the entire optical system) by utilizing the transfer zooming mechanism. In such a way, the both lens groups are allowed to partake almost equally of the function in the variation of magnification, so that in providing a desired range of magnification, the refractive power of each movable lens group can be made weak as compared with the conventional type not only to allow the easy compensation for the variation of residual spherical aberration caused by the zooming without increasing the diameter of the front lens element of the lens system, but also to moderate the tolerance. In a zoom lens having so greatly increased range of magnification and so large aperture ratio including wide angle as in the present invention, when the distribution of refractive power is so dimentioned that the contact point at which one of the movable lens groups transfers from one to the other solution lies nearer the minimum focal length position than the maximum one in the zooming region, the refractive power of each movable lens group (particularly lens group III) may be made weak, but the image shift sensitivity of lens group II increases rapidly on the side of the maximum focal length position. On the other hand, when the distribution of refractive power is so dimentioned that the transfer contact point lies nearer the maximum focal length position, the refractive power of each movable lens group (particularly lens group III) not only should be made strong, but also the image shift sensitivity of lens group III increases on the side of the minimum focal length position, whereby as the refractive power of each movable lens group increases, the variation of residual distortion caused chiefly by lens group II increases, and the under-correction of residual spherical aberration will be remarkably effected by lens group II in the middle position of the zooming. However, the weaker the refractive power of each movable lens group is, the more advantageously the aberrations are corrected, but the contact point at which one of the movable lens groups transfers from one to the other solution approaches the minimum focal length position the more closely, so that the image shift sensitivity of lens group II increases on the side of the maximum focal length position.

Next, what meanings the upper and lower limit values of the defining unequations (1) and (2) have will be explained in the form that the optical system will not be established effectively if the limits of these defining unequations are violated. Defining unequations (1) and (2) are correlated with each other, but firstly in connection with (1):

In the case of $|f_2| < 0.18f_1, f_3 < 0.35f_1$, residual distortion varies remarkably during the zooming, and remarkable under-correction of residual spherical aberration results at the intermediate position of the zooming, so that a zoom lens having so greatly increased range of magnification and so large aperture ratio including wide angle as embodying this invention cannot be corrected to compensate for both of these residual aberrations. In the case of $|f_2| < 0.18f_1, f_3 < 0.90f_1$, or $|f_2| > 0.42f_1, f_3 < 0.35f_1$, the movable lens for compensating the focal point shift cannot transfer from one to the other solution, thus the condition being contrary to the subject of this invention. A condition of $|f_2| < 0.42f_1$ and $f_3 > 0.90f_1$, would be advantageous for the removal of the aberration variation caused by the zooming, but by so dimentioning the distribution of power, the contact point at which one of the movble lens groups transfers from one to the other solution will be made to lie too close to the maximum focal length position, and the image shift sensitivity of lens group II will be increased remarkably on the side of the maximum focal length position so that such distribution of power cannot be practically embodied in the zoom lens having so large aperture ratio as in this invention.

Secondly in connection with (2), in the case of $\alpha < 0.50$, the refractive powers of the both movable lens groups satisfying this condition may be made weak so that the condition is desirous for aberration correction, but the image shift sensitivity of the lens group II increases remarkably on the side of the maximum focal length position, thus the condition cannot be practically embodied in the zoom lens of so large aperture ratio as in this invention. On the other hand, in the case of $\alpha > 0.95$, distribution of refractive power satisfying this condition is such that the refractive powers of the both movable lens groups are strong. Therefore, the variation of residual distortion caused by the zooming as well as the undercorrection of residual spherical aberration in the intermediate position of the zooming are intensified so that the greatly variable magnification zoom lens of large aperture ratio including wide angle cannot be corrected to compensate for both of them. Moreover, the image shift sensitivity of lens group III increases remarkably on the side of the minimum focal length position, thus the condition cannot be practically embodied in the zoom lens of large aperture ratio such as of this invention. Further, in the greatly variable magnification zoom lens of large aperture ratio as embodying this invention, the tolerances requiring for making the sliding parts of the movable lens groups are severest generally in the neighborhood of the maximum focal length position of lens group II. Therefore, if the combination of conditions $$0.18f_1 < |f_2| < 0.34f_1, 0.35f_1 < f_3 < 0.80f_1, 0.65 < \alpha < 0.95$$

is employed, the image shift sensitivity of lens group II on the side of the maximum focal length position is smaller than in the case of defining unequations (1) and (2) so that the tolerance which is severest in the neighborhood of the maximum focal length position of lens group II may be reduced to allow the easy production thereof. In conclusion, the satisfaction of conditions (1) and (2) makes it possible to provide a high performance compact zoom lens having a greatly increased range of magnification and large aperture ratio which is corrected for residual aberrations to good degree throughout the entire zooming region.

The constructional data (Examples 1 - 4) embodying this invention are given in the following, in which $r$ denotes the radius of curvature of the lens elements, $d$ the axial air spacing of the lens elements, $n$ the refractive index (for d line) of the lens element glasses, and $\nu$ the Abbe number of the lens element glasses.

Example 1

$f = 7.238 - 68.79\ F/1.4$
Zoom Ratio: 9.504
Image Angle: 54.2° – 5.8°

| ri | di | ni | vi |
|---|---|---|---|
| 191.7 | 1.7 | 1.80518 | 25.4 |
| 58.385 | 0.366 | | |
| 62.232 | 8.5 | 1.64000 | 60.2 |
| −168.79 | 0.2 | | |
| 43.4021 | 6.5 | 1.64000 | 60.2 |
| 207.42 | ($d_6$) | | |
| 267.23 | 1.0 | 1.71300 | 54.0 |
| 18.235 | 5.3 | | |
| −29.654 | 0.7 | 1.69680 | 55.7 |
| 18.9525 | 4.5 | 1.80518 | 25.4 |
| 125.36 | ($d_{11}$) | | |
| 5852.3 | 1.19 | 1.80518 | 25.4 |
| 43.22 | 6.98 | 1.64000 | 60.2 |
| −37.9 | 0.2 | | |
| 38.2234 | 3.71 | 1.65160 | 58.6 |
| 224.952 | ($d_{16}$) | | |
| −60.061 | 0.7 | 1.65160 | 58.6 |
| 21.63 | 2.3 | 1.80518 | 25.4 |
| 50.002 | 2.35 | | |
| 0. | 11.0 | 1.63854 | 55.4 |
| 0. | 6.06 | | |
| 21.63 | 3.37 | 1.76200 | 40.2 |
| 63.98 | 2.62 | | |
| 12.0776 | 3.07 | 1.71300 | 54.0 |
| 29.918 | 1.83 | 1.80518 | 25.4 |
| 8.5258 | 6.07 | | |
| −13.987 | 1.0 | 1.80518 | 25.4 |
| 57.565 | 3.96 | 1.67790 | 55.3 |
| −19.74 | 0.41 | | |
| 117.089 | 2.03 | 1.66446 | 35.8 |
| −32.11 | 0.1 | | |
| 21.7328 | 2.13 | 1.58144 | 40.7 |
| −132.36 | 1.2 | | |
| 0. | 6.8 | 1.63854 | 55.4 |
| 0. | | | |

| | $f = 7.238$ | $f = 15.72$ | $f = 68.79$ |
|---|---|---|---|
| $d_6$ | 1.000 | 14.826 | 28.652 |
| $d_{11}$ | 68.654 | 47.639 | 12.561 |
| $d_{16}$ | 2.006 | 9.195 | 30.446 |

$f_1 = 61.153$
$f_2 = -15.120$
$f_3 = 35.716$
$\alpha = 0.8$

Example 2

$f = 7.239 - 68.83\ F/1.4$
Zoom Ratio: 9.508
Image Angle: 54.2° – 5.8°

| ri | di | ni | vi |
|---|---|---|---|
| 113.17 | 1.7 | 1.80518 | 25.4 |
| 49.111 | 8.7 | 1.64000 | 60.2 |
| −314.35 | 0.2 | | |
| 46.653 | 6.0 | 1.64000 | 60.2 |
| 184.659 | ($d_5$) | | |
| 226.12 | 1.0 | 1.71300 | 54.0 |
| 18.956 | 5.2 | | |
| −32.642 | 0.7 | 1.69680 | 55.7 |
| 18.272 | 3.5 | 1.80518 | 25.4 |
| 76.2925 | ($d_{10}$) | | |
| −155.74 | 2.56 | 1.80518 | 25.4 |
| 58.649 | 0.28 | | |
| 67.677 | 7.78 | 1.64000 | 60.2 |
| −33.25 | 0.2 | | |
| 35.292 | 4.17 | 1.65160 | 58.6 |
| 264.487 | ($d_{16}$) | | |
| −58.196 | 0.7 | 1.65160 | 58.6 |
| 20.822 | 2.3 | 1.80518 | 25.4 |
| 51.8332 | 2.35 | | |
| 0. | 11.0 | 1.63854 | 55.4 |
| 0. | 5.5 | | |
| 22.253 | 3.73 | 1.74400 | 44.8 |
| 59.119 | 1.9 | | |
| 11.689 | 3.71 | 1.71300 | 54.0 |
| 33.562 | 1.84 | 1.80518 | 25.4 |
| 8.2621 | 5.41 | | |
| −13.651 | 0.99 | 1.78470 | 26.2 |
| 50.924 | 3.67 | 1.67790 | 53.3 |
| −18.928 | 0.19 | | |
| 118.55 | 1.84 | 1.66446 | 35.8 |
| −32.295 | 0.08 | | |
| 20.755 | 2.08 | 1.58921 | 41.1 |
| −276.285 | 1.26 | | |
| 0. | 6.8 | 1.63854 | 55.4 |
| 0. | | | |

| | $f = 7.239$ | $f = 15.72$ | $f = 68.83$ |
|---|---|---|---|
| $d_5$ | 1.135 | 14.961 | 28.787 |
| $d_{10}$ | 66.848 | 45.835 | 10.742 |
| $d_{16}$ | 2.033 | 9.220 | 30.487 |

$f_1 = 62.640$
$f_2 = -15.119$
$f_3 = 35.714$
$\alpha = 0.8$

Example 3

$f = 7.239 - 68.83\ F/1.4$
Zoom Ratio: 9.508
Image Angle: 54.2° – 5.8°

| ri | di | ni | vi |
|---|---|---|---|
| 168.29 | 1.7 | 1.80518 | 25.4 |
| 54.169 | 0.78 | | |
| 55.638 | 9.0 | 1.64000 | 60.2 |
| −169.83 | 0.2 | | |
| 43.387 | 6.0 | 1.64000 | 60.2 |
| 164.541 | ($d_6$) | | |
| 414.98 | 1.0 | 1.71300 | 54.0 |
| 18.635 | 5.2 | | |
| −31.727 | 0.7 | 1.69680 | 55.7 |
| 19.199 | 3.5 | 1.80518 | 25.4 |
| 102.561 | ($d_{11}$) | | |
| 200.58 | 1.5 | 1.80518 | 25.4 |
| 42.381 | 0.99 | | |
| 46.967 | 6.5 | 1.64000 | 60.2 |
| −38.752 | 0.2 | | |
| 36.555 | 3.0 | 1.65160 | 58.6 |
| 108.907 | ($d_{17}$) | | |
| −73.881 | 0.7 | 1.65160 | 58.6 |
| 22.26 | 2.3 | 1.80518 | 25.4 |
| 44.8785 | 2.35 | | |
| 0. | 11.0 | 1.63854 | 55.4 |
| 0. | 6.0 | | |
| 21.144 | 2.45 | 1.76200 | 40.2 |
| 71.845 | 1.4 | | |
| 11.782 | 3.62 | 1.71300 | 54.0 |
| 32.121 | 1.42 | 1.80518 | 25.4 |
| 8.3216 | 6.18 | | |
| −13.972 | 1.0 | 1.78470 | 26.2 |
| 53.881 | 4.66 | 1.67790 | 53.3 |
| −18.843 | 0.5 | | |
| 133.88 | 1.84 | 1.66446 | 35.8 |
| −31.226 | 0.1 | | |
| 22.425 | 1.89 | 1.58900 | 48.6 |
| 315.807 | 1.2 | | |
| 0. | 6.8 | 1.63854 | 55.4 |
| 0. | | | |

| | $f = 7.239$ | $f = 15.72$ | $f = 68.83$ |
|---|---|---|---|
| $d_6$ | 1.179 | 15.005 | 28.831 |
| $d_{11}$ | 68.564 | 47.551 | 12.458 |
| $d_{17}$ | 2.121 | 9.308 | 30.575 |

$f_1 = 61.140$
$f_2 = -15.119$
$f_3 = 35.714$
$\alpha = 0.8$

Example 4

$f = 7.239 - 68.83\ F/1.4$
Zoom Ratio: 9.508
Image Angle: 54.2° – 5.8°

| ri | di | ni | vi |
|---|---|---|---|
| −452.18 | 1.7 | 1.80518 | 25.4 |
| 91.642 | 1.13 | | |
| 95.327 | 6.5 | 1.71300 | 54.0 |
| −169.32 | 0.2 | | |
| 182.65 | 4.0 | 1.60311 | 60.7 |
| −230.35 | 0.2 | | |
| 40.571 | 5.2 | 1.60311 | 60.7 |
| 93.8515 | ($d_8$) | | |
| 101.06 | 0.7 | 1.71300 | 54.0 |
| 20.514 | 5.5 | | |
| −31.549 | 0.7 | 1.69680 | 55.7 |
| 18.838 | 3.5 | 1.80518 | 25.4 |
| 50.9964 | ($d_{13}$) | | |

Example 4-continued f = 7.239 – 68.83 F/1.4
Zoom Ratio: 9.508
Image Angle: 54.2° – 5.8°

| ri | di | ni | vi |
|---|---|---|---|
| 130.16 | 1.0 | 1.80518 | 25.4 |
| 48.981 | 1.34 | | |
| 57.122 | 6.0 | 1.64000 | 60.2 |
| –40.845 | 0.2 | | |
| 38.987 | 2.5 | 1.65160 | 58.6 |
| 109.837 | ($d_{19}$) | | |
| –81.113 | 0.7 | 1.65160 | 58.6 |
| 22.079 | 2.3 | 1.80518 | 25.4 |
| 42.8213 | 2.35 | | |
| 0. | 11.0 | 1.63854 | 55.4 |
| 0. | 5.5 | | |
| 21.7 | 3.15 | 1.75700 | 47.9 |
| 65.65 | 0.1 | | |
| 11.5 | 3.88 | 1.71300 | 54.0 |
| 36.0 | 1.59 | 1.80518 | 25.4 |
| 8.13 | 6.29 | | |
| –13.8 | 1.72 | 1.78470 | 26.2 |
| 49.46 | 3.9 | 1.67790 | 53.3 |
| –18.66 | 1.76 | | |
| 137.39 | 2.36 | 1.66446 | 35.8 |
| –31.92 | 0.1 | | |
| 21.42 | 1.8 | 1.59270 | 35.6 |
| 1049.52 | 1.2 | | |
| 0. | 6.8 | 1.63854 | 55.4 |
| 0. | | | |

| | f = 7.239 | f = 15.72 | f = 68.83 |
|---|---|---|---|
| $d_8$ | 1.339 | 15.165 | 28.991 |
| $d_{13}$ | 69.980 | 48.967 | 13.874 |
| $d_{19}$ | 2.056 | 9.243 | 30.510 |

$f_1 = 61.140$
$f_2 = –15.119$
$f_3 = 35.714$
$\alpha = 0.8$

In connection with Examples 1 – 4 mentioned above, Seidel's aberration coefficients associated with the shortest, intermediate and longest focal length positions of the entire optical system are given in the following, wherein the object distance is infinite, and the aberration coefficients of each position are the values obtained by normalizing the entire optical system by the value of the shortest focal length.

SA, CM, AS, PT and DS denote spherical aberration coefficient, coma aberration coefficient, astigmatism coefficient and Petzval's sum and distortion aberration coefficient respectively.

Example 1

Position of diaphragm is 4.0mm after the 21st plane
f = 7.238

| | SA | CM | AS | PT | DS |
|---|---|---|---|---|---|
| 1 | 0.0000 | 0.0003 | 0.0058 | 0.0168 | 0.4748 |
| 2 | –0.0029 | 0.0006 | –0.0001 | –0.0553 | 0.0111 |
| 3 | 0.0024 | 0.0001 | 0.0000 | 0.0454 | 0.0016 |
| 4 | 0.0002 | –0.0031 | 0.0561 | 0.0167 | –1.3084 |
| 5 | 0.0003 | 0.0010 | 0.0029 | 0.0651 | 0.1991 |
| 6 | 0.0005 | –0.0076 | 0.1263 | –0.0136 | –1.8734 |
| 7 | –0.0006 | 0.0090 | –0.1405 | 0.0113 | 2.0230 |
| 8 | –0.0321 | 0.0438 | –0.0599 | –0.1652 | 0.3074 |
| 9 | 0.0003 | –0.0030 | 0.0340 | –0.1002 | 0.7486 |
| 10 | 0.0205 | –0.0361 | 0.0636 | 0.0135 | –0.1361 |
| 11 | –0.0293 | –0.0029 | –0.0003 | –0.0258 | –0.0026 |
| 12 | 0.0685 | 0.0442 | 0.0285 | 0.0006 | 0.0187 |
| 13 | –0.4799 | 0.0242 | –0.0012 | –0.0093 | 0.0005 |
| 14 | 0.8207 | –0.3816 | 0.1775 | 0.0745 | –0.1172 |
| 15 | 0.2165 | 0.0380 | 0.0067 | 0.0747 | 0.0143 |
| 16 | 0.1951 | –0.1567 | 0.1258 | –0.0127 | –0.0908 |
| 17 | –1.6130 | 0.6797 | –0.2864 | –0.0475 | 0.1407 |
| 18 | 0.5689 | –0.0007 | 0.0000 | 0.0172 | –0.0000 |
| 19 | –0.1369 | –0.0518 | –0.0196 | –0.0646 | –0.0318 |
| 20 | 0.0000 | 0.0000 | 0.0001 | 0. | 0.0465 |
| 21 | –0.0000 | –0.0000 | –0.0001 | 0. | –0.0465 |
| 22 | 1.6769 | 0.4068 | 0.0987 | 0.1447 | 0.0590 |
| 23 | 0.0744 | –0.0827 | 0.0919 | –0.0489 | –0.0478 |
| 24 | 0.2214 | 0.0711 | 0.0228 | 0.2494 | 0.0874 |
| 25 | –0.1052 | 0.0330 | –0.0104 | 0.0072 | 0.0010 |
| 26 | –1.3619 | –0.5192 | –0.1979 | –0.3787 | –0.2198 |
| 27 | –2.5037 | 0.0825 | –0.0027 | –0.2308 | 0.0077 |
| 28 | –0.0573 | –0.0480 | –0.0402 | –0.0053 | –0.0381 |

Example 1-continued

Position of diaphragm is 4.0mm after the 21st plane
f = 7.238

| | SA | CM | AS | PT | DS |
|---|---|---|---|---|---|
| 29 | 0.4709 | –0.0509 | 0.0055 | 0.1481 | –0.0166 |
| 30 | –0.0001 | –0.0012 | –0.0109 | 0.0247 | 0.1250 |
| 31 | 0.9961 | –0.0219 | 0.0005 | 0.0900 | –0.0020 |
| 32 | –0.0149 | –0.0367 | –0.0903 | 0.1224 | 0.0792 |
| 33 | 1.5653 | 0.0440 | 0.0012 | 0.0201 | 0.0006 |
| 34 | –1.1678 | 0.0246 | –0.0005 | 0. | 0.0000 |
| 35 | 0.8080 | –0.0170 | 0.0004 | 0. | –0.0000 |
| Total | 0.2012 | 0.0818 | –0.0128 | –0.0154 | 0.4153 |

Example 1 f = 15.72

| | SA | CM | AS | PT | DS |
|---|---|---|---|---|---|
| 1 | 0.0003 | 0.0008 | 0.0024 | 0.0168 | 0.0553 |
| 2 | –0.0644 | 0.1037 | –0.1669 | –0.0553 | 0.3578 |
| 3 | 0.0543 | –0.0847 | 0.1321 | 0.0454 | –0.2769 |
| 4 | 0.0039 | –0.0208 | 0.1118 | 0.0167 | –0.6909 |
| 5 | 0.0074 | –0.0070 | 0.0067 | 0.0651 | –0.0679 |
| 6 | 0.0102 | –0.0518 | 0.2636 | –0.0136 | –1.2729 |
| 7 | –0.0111 | 0.0538 | –0.2611 | 0.0113 | 1.2125 |
| 8 | –0.1556 | 0.1076 | –0.0744 | –0.1652 | 0.1657 |
| 9 | –0.0010 | 0.0038 | –0.0151 | –0.1002 | 0.4546 |
| 10 | 0.1073 | –0.0933 | 0.0811 | 0.0135 | –0.0823 |
| 11 | –0.1224 | –0.0018 | –0.0000 | –0.0258 | –0.0004 |
| 12 | 0.1937 | 0.0581 | 0.0174 | 0.0006 | 0.0054 |
| 13 | –0.8778 | 0.1203 | –0.0165 | –0.0093 | 0.0035 |
| 14 | 0.9850 | –0.4672 | 0.2216 | 0.0745 | –0.1405 |
| 15 | 0.5539 | 0.0111 | 0.0002 | 0.0747 | 0.0015 |
| 16 | 0.2006 | –0.1623 | 0.1314 | –0.0127 | –0.0961 |
| 17 | –1.6130 | 0.6797 | –0.2864 | –0.0475 | 0.1407 |
| 18 | 0.5689 | –0.0007 | 0.0000 | 0.0172 | –0.0000 |
| 19 | –0.1369 | –0.0518 | –0.0196 | –0.0646 | –0.0318 |
| 20 | 0.0000 | 0.0000 | 0.0001 | 0. | 0.0465 |
| 21 | –0.0000 | –0.0000 | –0.0001 | 0. | –0.0465 |
| 22 | 1.6769 | 0.4068 | 0.0987 | 0.1447 | 0.0590 |
| 23 | 0.0744 | –0.0827 | 0.0919 | –0.0489 | –0.0478 |
| 24 | 0.2214 | 0.0711 | 0.0228 | 0.2494 | 0.0874 |
| 25 | –0.1052 | 0.0330 | –0.0104 | 0.0072 | 0.0010 |
| 26 | –1.3619 | –0.5192 | –0.1979 | –0.3787 | –0.2198 |
| 27 | –2.5037 | 0.0825 | –0.0027 | –0.2308 | 0.0077 |
| 28 | –0.0573 | –0.0480 | –0.0402 | –0.0053 | –0.0381 |
| 29 | 0.4709 | –0.0509 | 0.0055 | 0.1481 | –0.0166 |
| 30 | –0.0001 | –0.0012 | –0.0109 | 0.0247 | 0.1250 |
| 31 | 0.9961 | –0.0219 | 0.0005 | 0.0900 | –0.0020 |
| 32 | –0.0149 | –0.0367 | –0.0903 | 0.1224 | 0.0792 |
| 33 | 1.5653 | 0.0440 | 0.0012 | 0.0201 | 0.0006 |
| 34 | –1.1678 | 0.0246 | –0.0005 | 0. | 0.0000 |
| 35 | 0.8080 | –0.0170 | 0.0004 | 0. | 0.0000 |
| Total | 0.3052 | 0.0821 | –0.0036 | –0.0154 | –0.2269 |

Example 1 f = 68.79

| | SA | CM | AS | PT | DS |
|---|---|---|---|---|---|
| 1 | 0.1085 | –0.0364 | 0.0122 | 0.0168 | –0.0097 |
| 2 | –23.5911 | 13.4260 | –7.6409 | –0.0553 | 4.3800 |
| 3 | 19.8780 | –11.2610 | 6.3795 | 0.0454 | –3.6397 |
| 4 | 1.4178 | –1.0858 | 0.8315 | 0.0167 | –0.6496 |
| 5 | 2.7251 | –1.4564 | 0.7784 | 0.0651 | –0.4508 |
| 6 | 3.7243 | –2.7971 | 2.1007 | –0.0136 | –1.5674 |
| 7 | –3.1070 | 2.2901 | –1.6879 | 0.0113 | 1.2358 |
| 8 | –4.3317 | 1.5364 | –0.5449 | –0.1652 | 0.2519 |
| 9 | –1.1794 | 0.8134 | –0.5610 | –0.1002 | 0.4561 |
| 10 | 3.9539 | –1.5252 | 0.5884 | 0.0135 | –0.2322 |
| 11 | –2.2772 | 0.4566 | –0.0916 | –0.0258 | 0.0235 |
| 12 | 1.4469 | –0.1724 | 0.0206 | 0.0006 | –0.0025 |
| 13 | –3.4885 | 1.0147 | –0.2951 | –0.0093 | 0.0886 |
| 14 | 1.5198 | –0.7557 | 0.3757 | 0.0745 | –0.2239 |
| 15 | 3.5464 | –0.7801 | 0.1716 | 0.0747 | –0.0542 |
| 16 | 0.1973 | –0.1643 | 0.1368 | –0.0127 | –0.1034 |
| 17 | –1.6130 | 0.6797 | –0.2864 | –0.0475 | 0.1407 |
| 18 | 0.5689 | –0.0007 | 0.0000 | 0.0172 | –0.0000 |
| 19 | –0.1369 | –0.0518 | –0.0196 | –0.0646 | –0.0318 |
| 20 | 0.0000 | 0.0000 | 0.0001 | 0. | 0.0465 |
| 21 | –0.0000 | –0.0000 | –0.0001 | 0. | –0.0465 |
| 22 | 1.6769 | 0.4068 | 0.0987 | 0.1447 | 0.0590 |
| 23 | 0.0744 | –0.0827 | 0.0919 | –0.0489 | –0.0478 |
| 24 | 0.2214 | 0.0711 | 0.0228 | 0.2494 | 0.0874 |
| 25 | –0.1052 | 0.0330 | –0.0104 | 0.0072 | 0.0010 |
| 26 | –1.3619 | –0.5192 | –0.1979 | –0.3787 | –0.2198 |
| 27 | –2.5037 | 0.0825 | –0.0027 | –0.2308 | 0.0077 |
| 28 | –0.0573 | –0.0480 | –0.0402 | –0.0053 | –0.0381 |

Example 1-continued f = 68.79

| | SA | CM | AS | PT | DS |
|---|---|---|---|---|---|
| 29 | 0.4709 | −0.0509 | 0.0055 | 0.1481 | −0.0166 |
| 30 | −0.0001 | −0.0012 | −0.0109 | 0.0247 | 0.1250 |
| 31 | 0.9961 | −0.0219 | 0.0005 | 0.0900 | −0.0020 |
| 32 | −0.0149 | −0.0367 | −0.0903 | 0.1224 | 0.0792 |
| 33 | 1.5653 | 0.0440 | 0.0012 | 0.0201 | 0.0006 |
| 34 | −1.1678 | 0.0246 | −0.0005 | 0. | 0.0000 |
| 35 | 0.8080 | −0.0170 | 0.0004 | 0. | −0.0000 |
| Total | −0.0360 | 0.0146 | 0.1358 | −0.0154 | −0.3530 |

Example 2

Position of diaphragm is 3.5mm after the 21st plane f = 7.239

| | SA | CM | AS | PT | DS |
|---|---|---|---|---|---|
| 1 | 0.0001 | 0.0006 | 0.0063 | 0.0285 | 0.3448 |
| 2 | −0.0003 | 0.0002 | −0.0002 | −0.0082 | 0.0074 |
| 3 | 0.0001 | −0.0026 | 0.0549 | 0.0090 | −1.3353 |
| 4 | 0.0001 | 0.0005 | 0.0024 | 0.0605 | 0.2893 |
| 5 | 0.0004 | −0.0067 | 0.1216 | −0.0153 | −1.9205 |
| 6 | −0.0005 | 0.0079 | −0.1350 | 0.0133 | 2.0710 |
| 7 | −0.0246 | 0.0324 | −0.0426 | −0.1589 | 0.2657 |
| 8 | 0.0002 | −0.0022 | 0.0288 | −0.0911 | 0.8014 |
| 9 | 0.0174 | −0.0323 | 0.0598 | 0.0140 | −0.1366 |
| 10 | −0.0326 | 0.0052 | −0.0008 | −0.0423 | 0.0068 |
| 11 | 0.0075 | 0.0160 | 0.0342 | −0.0207 | 0.0288 |
| 12 | −3.8660 | 0.0738 | −0.0014 | −0.0551 | 0.0011 |
| 13 | 3.1728 | −0.0245 | 0.0002 | 0.0417 | −0.0003 |
| 14 | 0.8457 | −0.3800 | 0.1707 | 0.0850 | −0.1149 |
| 15 | 0.4703 | 0.0546 | 0.0063 | 0.0809 | 0.0101 |
| 16 | 0.1989 | −0.1569 | 0.1238 | −0.0108 | −0.0891 |
| 17 | −1.6006 | 0.6659 | −0.2770 | −0.0491 | 0.1357 |
| 18 | 0.6831 | −0.0025 | 0.0000 | 0.0179 | −0.0001 |
| 19 | −0.1223 | −0.0492 | −0.0198 | −0.0623 | −0.0330 |
| 20 | −0.0000 | 0.0000 | −0.0000 | 0. | 0.0465 |
| 21 | 0.0000 | −0.0000 | 0.0000 | 0. | −0.0465 |
| 22 | 1.5301 | 0.3803 | 0.0945 | 0.1388 | 0.0580 |
| 23 | 0.0251 | −0.0448 | 0.0799 | −0.0522 | −0.0492 |
| 24 | 0.7360 | 0.2069 | 0.0581 | 0.2578 | 0.0888 |
| 25 | −0.1486 | 0.0388 | −0.0102 | 0.0064 | 0.0010 |
| 26 | −1.5290 | −0.5788 | −0.2191 | −0.3908 | −0.2309 |
| 27 | −2.5161 | 0.1158 | −0.0053 | −0.2331 | 0.0110 |
| 28 | −0.0616 | −0.0480 | −0.0373 | −0.0051 | −0.0330 |
| 29 | 0.5447 | −0.0586 | 0.0063 | 0.1545 | −0.0173 |
| 30 | −0.0001 | −0.0012 | −0.0131 | 0.0244 | 0.1222 |
| 31 | 1.0139 | −0.0514 | 0.0026 | 0.0895 | −0.0047 |
| 32 | −0.0189 | −0.0410 | −0.0892 | −0.1293 | 0.0872 |
| 33 | 1.3902 | −0.0395 | 0.0011 | 0.0097 | −0.0003 |
| 34 | −1.1664 | 0.0622 | −0.0033 | 0. | 0.0002 |
| 35 | 0.8066 | −0.0430 | 0.0023 | 0. | −0.0001 |
| Total | 0.3558 | 0.0978 | −0.0006 | −0.0338 | 0.3650 |

Example 2 f = 15.72

| | SA | CM | AS | PT | DS |
|---|---|---|---|---|---|
| 1 | 0.0014 | 0.0007 | 0.0003 | 0.0285 | 0.0136 |
| 2 | −0.0057 | 0.0103 | −0.0186 | −0.0082 | 0.0486 |
| 3 | 0.0028 | −0.0170 | 0.1027 | 0.0090 | −0.6759 |
| 4 | 0.0025 | −0.0016 | 0.0011 | 0.0605 | −0.0401 |
| 5 | 0.0083 | −0.0452 | 0.2467 | −0.0153 | −1.2624 |
| 6 | −0.0093 | 0.0484 | −0.2505 | 0.0133 | 1.2289 |
| 7 | −0.1170 | 0.0772 | −0.0509 | −0.1589 | 0.1385 |
| 8 | −0.0010 | 0.0045 | −0.0196 | −0.0911 | 0.4814 |
| 9 | 0.0916 | −0.0824 | 0.0741 | 0.0140 | −0.0792 |
| 10 | −0.1409 | 0.0149 | −0.0016 | −0.0423 | 0.0046 |
| 11 | 0.0364 | 0.0343 | 0.0323 | −0.0207 | 0.0109 |
| 12 | −7.0054 | 0.7876 | −0.0886 | −0.0551 | 0.0161 |
| 13 | 5.7879 | −0.6028 | 0.0628 | 0.0417 | −0.0109 |
| 14 | 1.0124 | −0.4662 | 0.2147 | 0.0850 | −0.1380 |
| 15 | 1.0460 | −0.0174 | 0.0003 | 0.0809 | −0.0014 |
| 16 | 0.2076 | −0.1647 | 0.1307 | −0.0108 | −0.0951 |
| 17 | −1.6006 | 0.6659 | −0.2770 | −0.0491 | 0.1357 |
| 18 | 0.6831 | −0.0025 | 0.0000 | 0.0179 | −0.0001 |
| 19 | −0.1223 | −0.0492 | −0.0198 | −0.0623 | −0.0330 |
| 20 | −0.0000 | 0.0000 | −0.0000 | 0. | 0.0465 |
| 21 | 0.0000 | −0.0000 | 0.0000 | 0. | −0.0465 |
| 22 | 1.5301 | 0.3803 | 0.0945 | 0.1388 | 0.0580 |
| 23 | 0.0251 | −0.0448 | 0.0799 | −0.0522 | −0.0492 |
| 24 | 0.7360 | 0.2069 | 0.0581 | 0.2578 | 0.0888 |
| 25 | −0.1486 | 0.0388 | −0.0102 | 0.0064 | 0.0010 |
| 26 | −1.5290 | −0.5788 | −0.2191 | −0.3908 | −0.2309 |
| 27 | −2.5161 | 0.1158 | −0.0053 | −0.2331 | 0.0110 |
| 28 | −0.0616 | −0.0480 | −0.0373 | −0.0051 | −0.0330 |

Example 2-continued f = 15.72

| | SA | CM | AS | PT | DS |
|---|---|---|---|---|---|
| 29 | 0.5447 | −0.0586 | 0.0063 | 0.1545 | −0.0173 |
| 30 | −0.0001 | −0.0012 | −0.0131 | 0.0244 | 0.1222 |
| 31 | 1.0139 | −0.0514 | 0.0026 | 0.0895 | −0.0047 |
| 32 | −0.0189 | −0.0410 | −0.0892 | 0.1293 | 0.0872 |
| 33 | 1.3902 | −0.0395 | 0.0011 | 0.0097 | −0.0003 |
| 34 | −1.1664 | 0.0622 | −0.0033 | 0. | 0.0002 |
| 35 | 0.8066 | −0.0430 | 0.0023 | 0. | −0.0001 |
| Total | 0.4837 | 0.921 | 0.0063 | −0.0338 | −0.2251 |

Example 2 f = 68.83

| | SA | CM | AS | PT | DS |
|---|---|---|---|---|---|
| 1 | 0.5286 | −0.2436 | 0.1122 | 0.0285 | −0.0649 |
| 2 | −2.0763 | 1.2042 | −0.6984 | −0.0082 | 0.4098 |
| 3 | 1.0291 | −0.8245 | 0.6607 | 0.0090 | −0.5366 |
| 4 | 0.9206 | −0.4781 | 0.2483 | 0.0605 | −0.1604 |
| 5 | 3.0439 | −2.3440 | 1.8051 | −0.0153 | −1.3783 |
| 6 | −2.7058 | 2.0389 | −1.5363 | 0.0133 | 1.1476 |
| 7 | −3.0576 | 1.0393 | −0.3533 | −0.1589 | 0.1741 |
| 8 | −1.0299 | 0.7334 | −0.5222 | −0.0911 | 0.4366 |
| 9 | 3.4014 | −1.2992 | 0.4963 | 0.0140 | −0.1949 |
| 10 | −2.9197 | 0.6495 | −0.1445 | −0.0423 | 0.0415 |
| 11 | 0.4557 | 0.0223 | 0.0011 | −0.0207 | −0.0010 |
| 12 | −27.4077 | 7.6014 | −2.1082 | −0.0551 | 0.6000 |
| 13 | 22.9158 | −6.2634 | 1.7119 | 0.0417 | −0.4793 |
| 14 | 1.5436 | −0.7526 | 0.3670 | 0.0850 | −0.2204 |
| 15 | 5.6184 | −1.3085 | 0.3048 | 0.0809 | −0.0898 |
| 16 | 0.2161 | −0.1749 | 0.1415 | −0.0108 | −0.1058 |
| 17 | −1.6006 | 0.6659 | −0.2770 | −0.0491 | 0.1357 |
| 18 | 0.6831 | −0.0025 | 0.0000 | 0.0179 | −0.0001 |
| 19 | −0.1223 | −0.0492 | −0.0198 | −0.0623 | −0.0330 |
| 20 | −0.0000 | 0.0000 | −0.0000 | 0. | 0.0465 |
| 21 | 0.0000 | −0.0000 | 0.0000 | 0. | −0.0465 |
| 22 | 1.5302 | 0.3803 | 0.0945 | 0.1388 | 0.0580 |
| 23 | 0.0251 | −0.0448 | 0.0799 | −0.0522 | −0.0492 |
| 24 | 0.7360 | 0.2069 | 0.0581 | 0.2578 | 0.0888 |
| 25 | −0.1486 | 0.0388 | −0.0102 | 0.0064 | 0.0010 |
| 26 | −1.5291 | −0.5788 | −0.2191 | −0.3908 | −0.2309 |
| 27 | −2.5161 | 0.1158 | −0.0053 | −0.2331 | 0.0110 |
| 28 | −0.0616 | −0.0480 | −0.0373 | −0.0051 | −0.0330 |
| 29 | 0.5447 | −0.0586 | 0.0063 | 0.1545 | −0.0173 |
| 30 | 0.0001 | −0.0012 | −0.0131 | 0.0244 | 0.1222 |
| 31 | 1.0139 | −0.0514 | 0.0026 | 0.0895 | −0.0047 |
| 32 | −0.0189 | −0.0410 | −0.0892 | 0.1293 | 0.0872 |
| 33 | 1.3902 | −0.0395 | 0.0011 | 0.0097 | −0.0003 |
| 34 | −1.1664 | 0.0622 | −0.0033 | 0. | 0.0002 |
| 35 | 0.8066 | −0.0430 | 0.0023 | 0. | −0.0001 |
| Total | 0.0423 | 0.1116 | 0.0565 | −0.0338 | −0.2864 |

Example 3

Position of diaphragm is 4.0mm after the 22nd plane f = 7.239

| | SA | CM | AS | PT | DS |
|---|---|---|---|---|---|
| 1 | 0.0000 | 0.0003 | 0.0061 | 0.0192 | 0.4462 |
| 2 | −0.0035 | 0.0021 | −0.0012 | −0.0596 | 0.0362 |
| 3 | 0.0032 | −0.0015 | 0.0007 | 0.0508 | −0.0239 |
| 4 | 0.0002 | −0.0038 | 0.0643 | 0.0166 | −1.3830 |
| 5 | 0.0003 | 0.0008 | 0.0027 | 0.0651 | 0.2237 |
| 6 | 0.0004 | −0.0065 | 0.1169 | −0.0172 | −1.7923 |
| 7 | −0.0007 | 0.0103 | −0.1512 | 0.0073 | 2.1078 |
| 8 | −0.0030 | 0.0407 | −0.0536 | −0.1617 | 0.2834 |
| 9 | 0.0002 | −0.0031 | 0.0392 | −0.0937 | 0.6893 |
| 10 | 0.0191 | −0.0332 | 0.0577 | 0.0133 | −0.1236 |
| 11 | −0.0311 | 0.0000 | −0.0000 | −0.0315 | 0.0000 |
| 12 | 0.1661 | 0.0618 | 0.0230 | 0.0161 | 0.0145 |
| 13 | −4.6559 | 0.1839 | −0.0073 | −0.0762 | 0.0033 |
| 14 | 4.0037 | −0.1129 | 0.0032 | 0.0601 | −0.0018 |
| 15 | 1.0482 | −0.4688 | 0.2096 | 0.0729 | −0.1263 |
| 16 | 0.1453 | 0.0281 | 0.0054 | 0.0781 | 0.0162 |
| 17 | 0.0778 | −0.0868 | 0.0970 | −0.0262 | −0.0790 |
| 18 | −1.2952 | 0.5768 | −0.2569 | −0.0387 | 0.1316 |
| 19 | 0.4516 | 0.0034 | 0.0000 | 0.0168 | 0.0001 |
| 20 | −0.1884 | −0.0614 | −0.0200 | −0.0719 | −0.0300 |
| 21 | −0.0000 | 0.0000 | −0.0000 | 0. | 0.0465 |
| 22 | 0.0000 | −0.0000 | 0.0000 | 0. | −0.0465 |
| 23 | 1.7898 | 0.4245 | 0.1007 | 0.1481 | 0.0590 |
| 24 | 0.1526 | −0.1238 | 0.1004 | −0.0436 | −0.0461 |
| 25 | 0.2888 | 0.0778 | 0.0210 | 0.2557 | 0.0746 |
| 26 | −0.1868 | 0.0462 | −0.0114 | 0.0067 | 0.0012 |
| 27 | −1.4284 | −0.4847 | −0.1645 | −0.3880 | −0.1875 |
| 28 | −2.9621 | 0.1322 | −0.0059 | −0.2278 | 0.0104 |

Example 3-continued

Position of diaphragm is 4.0mm after the 22nd plane
f = 7.239

| | SA | CM | AS | PT | DS |
|---|---|---|---|---|---|
| 29 | −0.0413 | −0.0342 | −0.0284 | −0.0048 | −0.0275 |
| 30 | 0.8365 | −0.0459 | 0.0025 | 0.1552 | −0.0087 |
| 31 | −0.0010 | 0.0060 | −0.0366 | 0.0216 | 0.0910 |
| 32 | 1.4173 | 0.0051 | 0.0000 | 0.0925 | 0.0003 |
| 33 | −0.0043 | −0.0217 | −0.1098 | 0.1197 | 0.0499 |
| 34 | 1.0921 | −0.0757 | 0.0052 | −0.0085 | 0.0002 |
| 35 | −1.1666 | 0.0528 | −0.0024 | 0. | 0.0001 |
| 36 | 0.8068 | −0.0365 | 0.0017 | 0. | −0.0001 |
| Total | 0.3038 | 0.0525 | 0.0081 | −0.0335 | 0.4094 |

Example 3 f = 15.72

| | SA | CM | AS | PT | DS |
|---|---|---|---|---|---|
| 1 | 0.0004 | 0.0010 | 0.0021 | 0.0192 | 0.0461 |
| 2 | −0.0778 | 0.1316 | −0.2227 | −0.0596 | 0.4777 |
| 3 | 0.0705 | −0.1174 | 0.1954 | 0.0508 | −0.4097 |
| 4 | 0.0049 | −0.0255 | 0.1320 | 0.0166 | −0.7708 |
| 5 | 0.0056 | −0.0048 | 0.0042 | 0.0651 | −0.0601 |
| 6 | 0.0081 | −0.0433 | 0.2327 | −0.0172 | −1.1585 |
| 7 | −0.0129 | 0.0599 | −0.2788 | 0.0073 | 1.2648 |
| 8 | −0.1488 | 0.0995 | −0.0665 | −0.1617 | 0.1525 |
| 9 | −0.0003 | 0.0011 | −0.0046 | −0.0937 | 0.4172 |
| 10 | 0.0997 | −0.0855 | 0.0734 | 0.0133 | −0.0744 |
| 11 | −0.1317 | 0.0047 | −0.0002 | −0.0315 | 0.0011 |
| 12 | 0.4068 | 0.0589 | 0.0085 | 0.0161 | 0.0036 |
| 13 | −8.5133 | 1.0946 | −0.1407 | −0.0762 | 0.0279 |
| 14 | 7.3830 | −0.8884 | 0.1069 | 0.0601 | −0.0201 |
| 15 | 1.2982 | −0.5947 | 0.2725 | 0.0729 | −0.1582 |
| 16 | 0.4086 | 0.0133 | 0.0004 | 0.0781 | 0.0026 |
| 17 | 0.0647 | −0.0768 | 0.0911 | −0.0262 | −0.0769 |
| 18 | −1.2952 | 0.5769 | −0.2569 | −0.0387 | 0.1316 |
| 19 | 0.4516 | 0.0034 | 0.0000 | 0.0168 | 0.0001 |
| 20 | −0.1884 | −0.0614 | −0.0200 | −0.0719 | −0.0300 |
| 21 | −0.0000 | 0.0000 | −0.0000 | 0. | 0.0465 |
| 22 | 0.0000 | −0.0000 | 0.0000 | 0. | −0.0465 |
| 23 | 1.7898 | 0.4245 | 0.1007 | 0.1481 | 0.0590 |
| 24 | 0.1526 | −0.1238 | 0.1004 | −0.0436 | −0.0461 |
| 25 | 0.2888 | 0.0778 | 0.0210 | 0.2557 | 0.0746 |
| 26 | −0.1868 | 0.0462 | −0.0114 | 0.0067 | 0.0012 |
| 27 | −1.4284 | −0.4847 | −0.1645 | −0.3880 | −0.1875 |
| 28 | −2.9621 | 0.1322 | −0.0059 | −0.2278 | 0.0104 |
| 29 | −0.0413 | −0.0342 | −0.0284 | −0.0048 | −0.0275 |
| 30 | 0.8365 | −0.0459 | 0.0025 | 0.1552 | −0.0087 |
| 31 | −0.0010 | 0.0060 | −0.0366 | 0.0216 | 0.0910 |
| 32 | 1.4173 | 0.0051 | 0.0000 | 0.0925 | 0.0003 |
| 33 | −0.0043 | −0.0217 | −0.1098 | 0.1197 | 0.0499 |
| 34 | 1.0921 | −0.0757 | 0.0052 | −0.0085 | 0.0002 |
| 35 | −1.1666 | 0.0528 | −0.0024 | 0. | 0.0001 |
| 36 | 0.8068 | −0.0365 | 0.0017 | 0. | −0.0001 |
| Total | 0.4270 | 0.0690 | 0.0011 | −0.0335 | −0.2167 |

Example 3 f = 68.83

| | SA | CM | AS | PT | DS |
|---|---|---|---|---|---|
| 1 | 0.1607 | −0.0594 | 0.0220 | 0.0192 | −0.0152 |
| 2 | −28.5623 | 16.3220 | −9.3273 | −0.0596 | 5.3641 |
| 3 | 25.8891 | −14.7573 | 8.4120 | 0.0508 | −4.8239 |
| 4 | 1.8015 | −1.3580 | 1.0237 | 0.0166 | −0.7842 |
| 5 | 2.0452 | −1.0807 | 0.5710 | 0.0651 | −0.3361 |
| 6 | 2.9558 | −2.2574 | 1.7240 | −0.0172 | −1.3036 |
| 7 | −3.4186 | 2.4809 | −1.8003 | 0.0073 | 1.3012 |
| 8 | −4.0683 | 1.4199 | −0.4956 | −0.1617 | 0.2294 |
| 9 | −0.9586 | 0.6754 | −0.4759 | −0.0937 | 0.4013 |
| 10 | 3.6471 | −1.3945 | 0.5332 | 0.0133 | −0.2090 |
| 11 | −2.5614 | 0.5438 | −0.1154 | −0.0315 | 0.0312 |
| 12 | 2.5275 | −0.4311 | 0.0735 | 0.0161 | −0.0153 |
| 13 | −33.8581 | 9.6802 | −2.7676 | −0.0762 | 0.8130 |
| 14 | 29.8177 | −8.4055 | 2.3695 | 0.0601 | −0.6849 |
| 15 | 2.2079 | −1.0699 | 0.5184 | 0.0729 | −0.2865 |
| 16 | 2.8727 | −0.6145 | 0.1315 | 0.0781 | −0.0448 |
| 17 | 0.0246 | −0.0397 | 0.0639 | −0.0262 | −0.0607 |
| 18 | −1.2952 | 0.5768 | −0.2569 | −0.0387 | 0.1316 |
| 19 | 0.4516 | 0.0034 | 0.0000 | 0.0168 | 0.0001 |
| 20 | −0.1884 | −0.0614 | −0.0200 | −0.0719 | −0.0300 |
| 21 | −0.0000 | 0.0000 | −0.0000 | 0. | 0.0465 |
| 22 | 0.0000 | −0.0000 | 0.0000 | 0. | −0.0465 |
| 23 | 1.7898 | 0.4245 | 0.1007 | 0.1481 | 0.0590 |
| 24 | 0.1526 | −0.1238 | 0.1004 | −0.0436 | −0.0461 |
| 25 | 0.2888 | 0.0778 | 0.0210 | 0.2557 | 0.0746 |
| 26 | −0.1868 | 0.0462 | −0.0114 | 0.0067 | 0.0012 |

Example 3-continued f = 68.83

| | SA | CM | AS | PT | DS |
|---|---|---|---|---|---|
| 27 | −1.4285 | −0.4848 | −0.1645 | −0.3880 | −0.1875 |
| 28 | −2.9621 | 0.1322 | −0.0059 | −0.2278 | 0.0104 |
| 29 | −0.0413 | −0.0342 | −0.0284 | −0.0048 | −0.0275 |
| 30 | 0.8365 | −0.0459 | 0.0025 | 0.1552 | −0.0087 |
| 31 | −0.0010 | 0.0060 | −0.0366 | 0.0216 | 0.0910 |
| 32 | 1.4173 | 0.0051 | 0.0000 | 0.0925 | 0.0003 |
| 33 | −0.0043 | −0.0217 | −0.1093 | 0.1197 | 0.0499 |
| 34 | 1.0921 | −0.0757 | 0.0052 | −0.0085 | 0.0002 |
| 35 | −1.1666 | 0.0528 | −0.0024 | 0. | 0.0001 |
| 36 | 0.8069 | −0.0365 | 0.0017 | 0. | −0.0001 |
| Total | 0.0829 | 0.0950 | 0.0563 | −0.0335 | −0.3055 |

Example 4

Position of diaphragm is 3.5mm after the 24th plane
f = 7.239

| | SA | CM | AS | PT | DS |
|---|---|---|---|---|---|
| 1 | −0.0000 | 0.0001 | −0.0047 | −0.0071 | 0.8110 |
| 2 | −0.0018 | −0.0012 | −0.0008 | −0.0352 | −0.0249 |
| 3 | 0.0017 | 0.0014 | 0.0012 | 0.0316 | 0.0282 |
| 4 | 0.0000 | −0.0012 | 0.0269 | 0.0178 | −1.0441 |
| 5 | 0.0000 | 0.0001 | 0.0026 | 0.0149 | 0.4603 |
| 6 | 0.0003 | −0.0048 | 0.0779 | 0.0118 | −1.4640 |
| 7 | 0.0002 | 0.0005 | 0.0015 | 0.0671 | 0.2123 |
| 8 | 0.0001 | −0.0030 | 0.0823 | −0.0290 | −1.4574 |
| 9 | 0.0003 | 0.0039 | −0.0963 | 0.0298 | 1.6417 |
| 10 | −0.0159 | 0.0167 | −0.0175 | −0.1469 | 0.1725 |
| 11 | −0.0003 | 0.0027 | −0.0262 | −0.0942 | 1.1744 |
| 12 | 0.0147 | −0.0259 | 0.0457 | 0.0136 | −0.1046 |
| 13 | −0.0458 | 0.0207 | −0.0093 | −0.0633 | 0.0328 |
| 14 | 0.2491 | 0.0718 | 0.0207 | 0.0248 | 0.0131 |
| 15 | −2.7249 | −0.0113 | −0.0000 | −0.0659 | −0.0003 |
| 16 | 2.2112 | 0.0531 | 0.0013 | 0.0495 | 0.0012 |
| 17 | 1.0614 | −0.4705 | 0.2086 | 0.0692 | −0.1231 |
| 18 | 0.0621 | 0.0166 | 0.0045 | 0.0733 | 0.0208 |
| 19 | 0.0792 | −0.0874 | 0.0964 | −0.0260 | −0.0776 |
| 20 | −1.1830 | 0.5333 | −0.2404 | −0.0352 | 0.1243 |
| 21 | 0.4426 | 0.0056 | 0.0001 | 0.0169 | 0.0002 |
| 22 | −0.2169 | −0.0673 | −0.0209 | −0.0754 | −0.0298 |
| 23 | −0.0000 | 0.0000 | −0.0000 | 0. | 0.0465 |
| 24 | 0.0000 | −0.0000 | 0.0000 | 0. | −0.0465 |
| 25 | 1.6542 | 0.4017 | 0.0976 | 0.1437 | 0.0586 |
| 26 | 0.0792 | −0.0852 | 0.0917 | −0.0475 | −0.0475 |
| 27 | 0.8204 | 0.1909 | 0.0444 | 0.2620 | 0.0713 |
| 28 | −0.2439 | 0.0538 | −0.0118 | 0.0060 | 0.0013 |
| 29 | −1.7572 | −0.5663 | −0.1825 | −0.3971 | −0.1868 |
| 30 | −2.9012 | 0.1439 | −0.0071 | −0.2306 | 0.0118 |
| 31 | −0.0565 | −0.0438 | −0.0340 | −0.0052 | −0.0305 |
| 32 | 0.7912 | −0.0502 | 0.0032 | 0.1567 | −0.0101 |
| 33 | −0.0003 | 0.0032 | −0.0310 | 0.0210 | 0.0968 |
| 34 | 1.2100 | 0.0200 | 0.0003 | 0.0905 | 0.0015 |
| 35 | −0.0106 | −0.0337 | −0.1074 | 0.1258 | 0.0585 |
| 36 | 1.1873 | −0.0220 | 0.0004 | −0.0026 | 0.0000 |
| 37 | −1.1679 | 0.0135 | −0.0002 | 0. | 0.0000 |
| 38 | 0.8081 | −0.0093 | 0.0001 | 0. | −0.0000 |
| Total | 0.3465 | 0.0705 | 0.0169 | −0.0354 | 0.3916 |

Example 4 f = 15.72

| | SA | CM | AS | PT | DS |
|---|---|---|---|---|---|
| 1 | −0.0000 | 0.0004 | −0.0058 | −0.0071 | 0.2077 |
| 2 | −0.0393 | 0.0556 | −0.0787 | −0.0352 | 0.1611 |
| 3 | 0.0368 | −0.0508 | 0.0701 | 0.0316 | −0.1403 |
| 4 | 0.0011 | −0.0072 | 0.0466 | 0.0178 | −0.4191 |
| 5 | 0.0001 | 0.0003 | 0.0013 | 0.0149 | 0.0653 |
| 6 | 0.0065 | −0.0327 | 0.1643 | 0.0118 | −0.8836 |
| 7 | 0.0036 | −0.0033 | 0.0029 | 0.0671 | −0.0635 |
| 8 | 0.0024 | −0.0180 | 0.1325 | −0.0290 | −0.7619 |
| 9 | −0.0048 | 0.0300 | −0.1866 | 0.0298 | 0.9748 |
| 10 | −0.0715 | 0.0388 | −0.0210 | −0.1469 | 0.0910 |
| 11 | −0.0084 | 0.0298 | −0.1057 | −0.0942 | 0.7103 |
| 12 | 0.0769 | −0.0666 | 0.0577 | 0.0136 | −0.0617 |
| 13 | −0.2044 | 0.0525 | −0.0135 | −0.0633 | 0.0197 |
| 14 | 0.5805 | 0.0554 | 0.0053 | 0.0248 | 0.0029 |
| 15 | −5.1447 | 0.4907 | −0.0468 | −0.0659 | 0.0108 |
| 16 | 4.2353 | −0.3439 | 0.0279 | 0.0495 | −0.0063 |
| 17 | 1.3210 | −0.5998 | 0.2723 | 0.0692 | −0.1550 |
| 18 | 0.2203 | 0.0182 | 0.0015 | 0.0733 | 0.0062 |
| 19 | 0.0662 | −0.0775 | 0.0907 | −0.0260 | −0.0758 |
| 20 | −1.1830 | 0.5333 | −0.2404 | −0.0352 | 0.1243 |
| 21 | 0.4426 | 0.0056 | 0.0001 | 0.0169 | 0.0002 |
| 22 | −0.2169 | −0.0673 | −0.0209 | −0.0754 | −0.0298 |

Example 4-continued f = 15.72

|  | SA | CM | AS | PT | DS |
|---|---|---|---|---|---|
| 23 | −0.0000 | 0.0000 | −0.0000 | 0. | 0.0465 |
| 24 | 0.0000 | −0.0000 | 0.0000 | 0. | −0.0465 |
| 25 | 1.6542 | 0.4017 | 0.0976 | 0.1437 | 0.0586 |
| 26 | 0.0792 | −0.0852 | 0.0917 | −0.0475 | −0.0475 |
| 27 | 0.8204 | 0.1909 | 0.0444 | 0.2620 | 0.0713 |
| 28 | −0.2439 | 0.0538 | −0.0118 | 0.0060 | 0.0013 |
| 29 | −1.7572 | −0.5663 | −0.1825 | −0.3971 | −0.1868 |
| 30 | −2.9012 | 0.1439 | −0.0071 | −0.2306 | 0.0118 |
| 31 | −0.0565 | −0.0438 | −0.0340 | −0.0052 | −0.0305 |
| 32 | 0.7912 | −0.0502 | 0.0032 | 0.1567 | −0.0101 |
| 33 | −0.0003 | 0.0032 | −0.0310 | 0.0210 | 0.0968 |
| 34 | 1.2100 | 0.0200 | 0.0003 | 0.0905 | 0.0015 |
| 35 | −0.0106 | −0.0337 | −0.1074 | 0.1258 | 0.0585 |
| 36 | 1.1873 | −0.0220 | 0.0004 | −0.0026 | 0.0000 |
| 37 | −1.1679 | 0.0135 | −0.0002 | 0. | 0.0000 |
| 38 | 0.8081 | −0.0093 | 0.0001 | 0. | −0.0000 |
| Total | 0.5332 | 0.0599 | 0.0177 | −0.0354 | −0.1980 |

Example 4 f = 68.83

|  | SA | CM | AS | PT | DS |
|---|---|---|---|---|---|
| 1 | −0.0083 | 0.0109 | −0.0143 | −0.0071 | 0.0282 |
| 2 | −14.4225 | 7.9534 | −4.3860 | −0.0352 | 2.4381 |
| 3 | 13.5211 | −7.4314 | 4.0844 | 0.0316 | −2.2622 |
| 4 | 0.4037 | −0.3300 | 0.2697 | 0.0178 | −0.2350 |
| 5 | 0.0300 | −0.0080 | 0.0022 | 0.0149 | −0.0046 |
| 6 | 2.3953 | −1.7713 | 1.3098 | 0.0118 | −0.9774 |
| 7 | 1.3181 | −0.6919 | 0.3632 | 0.0671 | −0.2259 |
| 8 | 0.8977 | −0.7736 | 0.6667 | −0.0290 | −0.5496 |
| 9 | −1.9250 | 1.5087 | −1.1824 | 0.0298 | 0.9033 |
| 10 | −1.4213 | 0.4553 | −0.1459 | −0.1469 | 0.0938 |
| 11 | −2.4236 | 1.5954 | −1.0502 | −0.0942 | 0.7533 |
| 12 | 2.8304 | −1.0723 | 0.4062 | 0.0136 | −0.1591 |
| 13 | −4.7034 | 1.2261 | −0.3196 | −0.0633 | 0.0998 |
| 14 | 3.3668 | −0.6242 | 0.1157 | 0.0248 | −0.0261 |
| 15 | −21.6092 | 5.7677 | −1.5395 | −0.0659 | 0.4285 |
| 16 | 18.2460 | −4.7486 | 1.2359 | 0.0495 | −0.3345 |
| 17 | 2.2824 | −1.0956 | 0.5259 | 0.0692 | −0.2857 |
| 18 | 1.8735 | −0.3568 | 0.0679 | 0.0733 | −0.0269 |
| 19 | 0.0260 | −0.0409 | 0.0643 | −0.0260 | −0.0603 |
| 20 | −1.1830 | 0.5333 | −0.2404 | −0.0352 | 0.1243 |
| 21 | 0.4426 | 0.0056 | 0.0001 | 0.0169 | 0.0002 |
| 22 | −0.2169 | −0.0673 | −0.0209 | −0.0754 | −0.0298 |
| 23 | −0.0000 | 0.0000 | −0.0000 | 0. | 0.0465 |
| 24 | 0.0000 | −0.0000 | 0.0000 | 0. | −0.0465 |
| 25 | 1.6542 | 0.4018 | 0.0976 | 0.1437 | 0.0586 |
| 26 | 0.0792 | −0.0852 | 0.0917 | −0.0475 | −0.0475 |
| 27 | 0.8204 | 0.1910 | 0.0444 | 0.2620 | 0.0713 |
| 28 | −0.2439 | 0.0538 | −0.0118 | 0.0060 | 0.0013 |
| 29 | −1.7573 | −0.5664 | −0.1825 | −0.3971 | −0.1868 |
| 30 | −2.9012 | 0.1439 | −0.0071 | −0.2306 | 0.0118 |
| 31 | −0.0565 | −0.0438 | −0.0340 | −0.0052 | −0.0305 |
| 32 | 0.7912 | −0.0502 | 0.0032 | 0.1567 | −0.0101 |
| 33 | −0.0003 | 0.0032 | −0.0310 | 0.0210 | 0.0968 |
| 34 | 1.2100 | 0.0200 | 0.0003 | 0.0905 | 0.0015 |
| 35 | −0.0206 | −0.0337 | −0.1074 | 0.1258 | 0.0585 |
| 36 | 1.1874 | −0.0220 | 0.0004 | −0.0026 | 0.0000 |
| 37 | −1.1679 | 0.0135 | −0.0002 | 0. | 0.0000 |
| 38 | 0.8082 | −0.0093 | 0.0001 | 0. | −0.0000 |
| Total | 0.1332 | 0.0609 | 0.0766 | −0.0354 | −0.2824 |

FIGS. 6 – 9 show sectional views of the optical systems of above-mentioned Examples respectively under the conditions of infinite object distance and the shortest focal length position.

FIGS. 10abc – FIGS. 13abc show aberration graphs of above-mentioned Examples under conditions that the object distance is infinite, and the focal lengths of the entire system are the shortest, intermediate and longest respectively.

What is claimed is:

1. A greatly variable magnification zoom lens of large aperture ratio comprising lens group I of positive power, lens group II of negative power, lens group III of positive power and lens group IV arranged successively on the common optical axis whereby lens groups II and III are movable relative to lens group I to effect a continuous variation of magnification, said zoom lens system satisfying the conditions that the equivalent focal lengths and magnification powers of the lens groups, designated as $fi$, $mi$ ($i = 1 - 4$) respectively, are defined by $$0.24f_1 < |f_2| < 0.25f_1$$

$$0.57f_1 < f_3 < 0.59f_1$$

and when the equivalent focal length of the entire optical system varies from the minimum to the maximum with continuous variation in magnification, $|m_2|$ and $|m_3|$ not only increase in simple fashion, but coincide with each other at unity magnification (or $m_2 = m_1 = -1$) within the zooming region, whereby the relationship between the distance through which lens group II is displaced from the minimum equivalent focal length position to the coincidence position and the total distance through which lens group II is displaced from the minimum to maximum equivalent focal length position, designated as $V_{|m2|=1}$ and $V_{max}$ respectively, is established that in the ratio of $V_{|m2|=1}/V_{max}$, designated as $\alpha$ $$\alpha = 0.8$$

2. A zoom lens system comprising lens group I of positive power, lens group II of negative power, lens group III of positive power and lens group IV arranged successively on the common optical axis whereby lens groups II and III are movable relative to lens group I to effect a continuous variation of magnification, said zoom lens system having the following constitutional data:

f = 7.238 – 68.79  F/1.4
Zoom Ratio: 9.504
Image Angle: 54.2° – 5.8°

| ri | di | ni | vi |
|---|---|---|---|
| 191.7 | 1.7 | 1.80518 | 25.4 |
| 58.365 | 0.366 | | |
| 62.232 | 8.5 | 1.64000 | 60.2 |
| −168.79 | 0.2 | | |
| 43.4021 | 6.5 | 1.64000 | 60.2 |
| 207.42 | (d₆) | | |
| 267.23 | 1.0 | 1.71300 | 54.0 |
| 18.235 | 5.3 | | |
| −29.654 | 0.7 | 1.69680 | 55.7 |
| 18.9525 | 4.5 | 1.80518 | 25.4 |
| 125.35 | (d₁₁) | | |
| 5852.3 | 1.19 | 1.80518 | 25.4 |
| 43.22 | 6.98 | 1.6400 | 60.2 |
| −37.9 | 0.2 | | |
| 38.2234 | 3.71 | 1.65160 | 58.6 |
| 224.952 | (d₁₆) | | |
| −60.061 | 0.7 | 1.65160 | 58.6 |
| 21.63 | 2.3 | 1.80518 | 25.4 |
| 50.002 | 2.35 | | |
| 0. | 11.0 | 1.63854 | 55.4 |
| 0. | 6.06 | | |
| 21.63 | 3.37 | 1.76200 | 40.2 |
| 63.98 | 2.62 | | |
| 12.0776 | 3.07 | 1.71300 | 54.0 |
| 29.918 | 1.83 | 2.80518 | 25.4 |
| 8.5258 | 6.07 | | |
| −13.987 | 1.0 | 1.80518 | 25.4 |
| 57.565 | 3.96 | 1.67790 | 55.3 |
| −19.74 | 0.41 | | |
| 117.089 | 2.03 | 1.66446 | 35.8 |
| −32.11 | 0.1 | | |
| 21.7328 | 2.13 | 1.58144 | 40.7 |
| −132.36 | 1.2 | | |
| 0. | 6.8 | 1.63854 | 55.4 |
| 0. | | | |

| | f = 7.238 | f = 15.72 | f = 68.79 |
|---|---|---|---|
| d₆ | 1.000 | 14.826 | 28.652 |
| d₁₁ | 68.654 | 47.039 | 12.561 |

-continued
f = 7.238 − 68.79 F/1.4
Zoom Ratio: 9.504
Image Angle: 54.2° − 5.8°

| ri | di | ni | vi |
|---|---|---|---|
| $d_{16}$ | 2.006 | 9.195 | 30.446 |

$f_1 = 61.153$
$f_2 = -15.120$
$f_3 = 35.716$
$\alpha = 0.8$

3. A zoom lens system comprising lens group I of positive power, lens group II of negative power, lens group III of positive power and lens group IV arranged successively on the common optical axis whereby lens groups II and III are movable relative to lens group I to effect a continuous variation of magnification, said zoom lens system having the following constitutional data:

f = 7.239 − 68.83 F/1.4
Zoom Ratio: 9.508
Image Angle: 54.2° − 5.8°

| ri | di | ni | vi |
|---|---|---|---|
| 113.17 | 1.7 | 1.80518 | 25.4 |
| 49.111 | 8.7 | 1.64000 | 60.2 |
| −314.35 | 0.2 | | |
| 46.653 | 6.0 | 1.64000 | 60.2 |
| 184.659 | ($d_5$) | | |
| 226.12 | 1.0 | 1.71300 | 54.0 |
| 18.956 | 5.2 | | |
| −32.642 | 0.7 | 1.69680 | 55.7 |
| 18.272 | 3.5 | 1.80518 | 25.4 |
| 76.2925 | ($d_{10}$) | | |
| −155.74 | 2.56 | 1.80518 | 25.4 |
| 58.649 | 0.28 | | |
| 67.677 | 7.78 | 1.64000 | 60.2 |
| −33.25 | 0.2 | | |
| 35.292 | 4.17 | 1.65160 | 58.6 |
| 264.487 | ($d_{16}$) | | |
| −58.196 | 0.7 | 1.65160 | 58.6 |
| 20.822 | 2.3 | 1.80518 | 25.4 |
| 51.8332 | 2.35 | | |
| 0. | 11.0 | 1.63854 | 55.4 |
| 0. | 5.5 | | |
| 22.253 | 3.73 | 1.74400 | 44.8 |
| 59.119 | 1.9 | | |
| 11.689 | 3.71 | 1.71300 | 54.0 |
| 33.562 | 1.84 | 1.80518 | 25.4 |
| 8.2621 | 5.41 | | |
| −13.651 | 0.99 | 1.78470 | 26.2 |
| 50.924 | 3.67 | 1.67790 | 53.3 |
| −18.928 | 0.19 | | |
| 118.55 | 1.84 | 1.66446 | 35.8 |
| −32.295 | 0.08 | | |
| 20.755 | 2.08 | 1.58921 | 41.1 |
| −276.285 | 1.26 | | |
| 0. | 6.8 | 1.63854 | 55.4 |
| 0. | | | |

| | f = 7.239 | f = 15.72 | f = 68.83 |
|---|---|---|---|
| $d_5$ | 1.135 | 14.961 | 28.787 |
| $d_{10}$ | 66.848 | 45.835 | 10.742 |
| $d_{16}$ | 2.033 | 9.220 | 30.487 |

$f_1 = 62.640$
$f_2 = -15.119$
$f_3 = 35.714$
$\alpha = 0.8$

4. A zoom lens system comprising lens group I of positive power, lens group II of negative power, lens group III of positive power and lens group IV arranged successively on the common optical axis whereby lens groups II and III are movable relative to lens group I to effect a continuous variation of magnification, said zoom lens system having the following constitutional data:

f = 7.239 − 68.83 F/1.4
Zoom Ratio: 9.508
Image Angle: 54.2° − 5.8°

| ri | di | ni | vi |
|---|---|---|---|
| 168.29 | 1.7 | 1.80518 | 25.4 |
| 54.169 | 0.78 | | |
| 55.638 | 9.0 | 1.64000 | 60.2 |
| −169.83 | 0.2 | | |
| 43.387 | 6.0 | 1.64000 | 60.2 |
| 164.541 | ($d_5$) | | |
| 414.98 | 1.0 | 1.71300 | 54.0 |
| 18.635 | 5.2 | | |
| −31.727 | 0.7 | 1.69680 | 55.7 |
| 19.199 | 3.5 | 1.80518 | 25.4 |
| 102.561 | ($d_{11}$) | | |
| 200.58 | 1.5 | 1.80518 | 25.4 |
| 42.381 | 0.99 | | |
| 49.967 | 6.5 | 1.64000 | 60.2 |
| −38.752 | 0.2 | | |
| 36.555 | 3.0 | 1.65160 | 58.6 |
| 108.907 | ($d_{17}$) | | |
| −73.881 | 0.7 | 1.65160 | 58.6 |
| 22.26 | 2.3 | 1.80518 | 25.4 |
| −81.113 | 0.7 | 1.65160 | 58.6 |
| 22.079 | 2.3 | 1.80518 | 25.4 |
| 42.8213 | 2.35 | | |
| 0. | 11.0 | 1.63854 | 55.4 |
| 0. | 5.5 | | |
| 21.7 | 3.15 | 1.75700 | 47.9 |
| 65.65 | 0.1 | | |
| 11.5 | 3.88 | 1.71300 | 54.0 |
| 36.0 | 1.59 | 1.80518 | 25.4 |
| 8.13 | 6.29 | | |
| −13.8 | 1.72 | 1.78470 | 26.2 |
| 49.46 | 3.9 | 1.67790 | 53.3 |
| −18.66 | 1.76 | | |
| 137.39 | 2.36 | 1.66446 | 35.8 |
| −31.92 | 0.1 | | |
| 21.42 | 1.8 | 1.59270 | 35.6 |
| 1049.52 | 1.2 | | |
| 0. | 6.8 | 1.63854 | 55.4 |
| 0. | | | |

| | f = 7.239 | f = 15.72 | f = 68.83 |
|---|---|---|---|
| $d_5$ | 1.339 | 15.165 | 28.991 |
| $d_{11}$ | 69.980 | 48.967 | 13.874 |
| $d_{17}$ | 2.056 | 9.243 | 30.510 |

$f_1 = 61.140$
$f_2 = 15.119$
$f_3 = 35.714$
$\alpha = 0.8$

5. A zoom lens system comprising lens group I of positive power, lens group II of negative power, lens group III of positive power and lens group IV arranged successively on the common optical axis whereby lens group II and III are movable relative to lens group I to effect a continuous variation of magnification, said zoom lens system having the following constitutional data:

f = 7.239 − 68.83 F/1.4
Zoom Ratio: 9.508
Image Angle: 54.2° − 5.8°

| ri | di | ni | vi |
|---|---|---|---|
| −452.18 | 1.7 | 1.80518 | 25.4 |
| 91.642 | 1.13 | | |
| 95.327 | 6.5 | 1.71300 | 54.0 |
| −169.32 | 0.2 | | |
| 182.65 | 4.0 | 1.60311 | 60.7 |
| −23035 | 0.2 | | |
| 40.571 | 5.2 | 1.60311 | 6.07 |
| 93.8515 | ($d_8$) | | |
| 101.06 | 0.7 | 1.71300 | 54.0 |
| 20.514 | 5.5 | | |
| −31.549 | 0.7 | 1.69680 | 55.7 |
| 18.838 | 3.5 | 1.80518 | 25.4 |
| 50.9964 | ($d_{13}$) | | |
| 130.16 | 1.0 | 1.80518 | 25.4 |
| 48.981 | 1.34 | | |
| 57.122 | 6.0 | 1.64000 | 60.2 |
| −40.845 | 0.2 | | |
| 38.987 | 2.5 | 1.65160 | 58.6 |
| 109.837 | ($d_{19}$) | | |
| 44.8785 | 2.35 | | |
| 0. | 11.0 | 1.63854 | 55.4 |

-continued
f = 7.239 – 68.83 F/1.4
Zoom Ratio: 9.508
Image Angle: 54.2° – 5.8°

| ri | di | ni | vi |
|---|---|---|---|
| 0. | 6.0 | | |
| 21.144 | 2.45 | 1.76200 | 40.2 |
| 71.845 | 1.4 | | |
| 11.782 | 3.62 | 1.71300 | 54.0 |
| 32.121 | 1.42 | 1.80518 | 25.4 |
| 8.3216 | 6.18 | | |
| −13.972 | 1.0 | 1.78470 | 26.2 |
| 53.881 | 4.66 | 1.67790 | 53.3 |
| −18.843 | 0.5 | | |
| 133.88 | 1.84 | 1.66446 | 35.8 |
| −31.226 | 0.1 | | |

-continued
f = 7.239 – 68.83 F/1.4
Zoom Ratio: 9.508
Image Angle: 54.2° – 5.8°

| ri | di | ni | vi |
|---|---|---|---|
| 22.425 | 1.89 | 1.58900 | 48.6 |
| 315.807 | 1.2 | 1.63854 | 55.4 |
| 0. | 6.8 | | |

| | f = 7.239 | f = 15.72 | f = 68.83 |
|---|---|---|---|
| $d_6$ | 7.179 | 15.005 | 28.831 |
| $d_{11}$ | 68.564 | 42.551 | 12.458 |
| $d_{17}$ | 2.121 | 9.308 | 30.575 |

$f_1 = 61.140$
$f_2 = -15.119$
$f_3 = 35.714$
$\alpha = 0.8$.

\* \* \* \* \*